(12) United States Patent
Liu et al.

(10) Patent No.: US 10,374,522 B2
(45) Date of Patent: Aug. 6, 2019

(54) THREE-LEVEL CIRCUIT AND CONTROL METHOD FOR BALANCING NEUTRAL POINT VOLTAGE OF THE SAME

(71) Applicant: Delta Electronics (Shanghai) Co., Ltd., Shanghai (CN)

(72) Inventors: Hong Liu, Shanghai (CN); Hao Peng, Shanghai (CN); Cheng Lu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/183,715

(22) Filed: Nov. 7, 2018

(65) Prior Publication Data
US 2019/0181774 A1  Jun. 13, 2019

(30) Foreign Application Priority Data

Dec. 8, 2017 (CN) .......................... 2017 1 1294507

(51) Int. Cl.
*H02M 7/487* (2007.01)
*H02M 7/5387* (2007.01)

(52) U.S. Cl.
CPC ....... *H02M 7/487* (2013.01); *H02M 7/53873* (2013.01)

(58) Field of Classification Search
CPC .......... H02M 7/44; H02M 7/48; H02M 7/483; H02M 7/487; H02M 7/53; H02M 7/537; H02M 5/5387; H02M 7/53871
See application file for complete search history.

(56) References Cited

U.S. PATENT DOCUMENTS

| 5,321,599 A * | 6/1994 | Tanamachi ............ H02M 7/487 318/811 |
| 2015/0002066 A1* | 1/2015 | Oda ..................... H02M 5/4585 318/500 |

(Continued)

FOREIGN PATENT DOCUMENTS

| CN | 206117535 U | 4/2017 |
| CN | 107317500 A | 11/2017 |

(Continued)

OTHER PUBLICATIONS

Zhang Lun-Jian, Tan Guo-Jun, Chen Li-Ping, "Neutral-point potential balance control for three-level Z-source inverters based on double modulation wave technique", Power System Protection and Control, vol. 41,No. 7, Apr. 1, 2013.

(Continued)

*Primary Examiner* — Matthew V Nguyen
(74) *Attorney, Agent, or Firm* — CKC & Partners Co., LLC

(57) ABSTRACT

The present invention relates to a control method for balancing a neutral point voltage of a three-level circuit, comprising obtaining the neutral point voltage through sampling, adjusting a duty ratio of a zero level in one phase to maintain balance of the neutral point voltage when an absolute value of the neutral point voltage is larger than a threshold value, and distributing duty ratios of positive and negative levels in the phase, such that an output voltage of switch bridge arm in the phase includes positive, negative and zero levels in at least one switch period. The present invention can be carried out in a three-phase four-wire system and a three-phase three-wire system. In the three-phase three-wire system, it may also be combined with zero sequence voltage injection to form a mixed modulation (Continued)

method, thereby acquiring more effective neutral point balance control performance, and reducing switch loss.

28 Claims, 22 Drawing Sheets

(56) References Cited

U.S. PATENT DOCUMENTS

2019/0052177 A1* 2/2019 Lu .................... H02M 3/33569
2019/0068080 A1   2/2019 Wang et al.

FOREIGN PATENT DOCUMENTS

KR      20160101034 A     8/2016
WO      WO-2013120528 A1 * 8/2013  ............... H02J 3/36

OTHER PUBLICATIONS

Yao Xiuyuan, Jin Xinmin, Li Jinke, Wu Xuezhi, Li Huinan, "A Neutral Point Voltage Control Strategy for Parallel Connected Three-Level Inverters System", Power System Technology, vol. 39, No. 6, Jun. 2015.

* cited by examiner

THREE-LEVEL CIRCUIT AND CONTROL METHOD FOR BALANCING NEUTRAL POINT VOLTAGE OF THE SAME

CROSS-REFERENCE TO RELATED APPLICATIONS

This non-provisional application claims priority under 35 U.S.C. § 119(a) on Patent Application No. 201711294507.2 filed in P.R. China on Dec. 8, 2017, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

TECHNICAL FIELD

The present invention relates to the technical field of power electronics, and in particular, the present invention relates to a control method for balancing a neutral point voltage of a three-level circuit, and a three-level circuit using the same.

BACKGROUND ART

Inverter is a device converting a DC current into an AC current, and has a plurality of topological structures, among which three-level topological structure has advantages of large output capacity, high output voltage and small current harmonic content, and is widely applied in the fields of AC motor speed regulation, new energy power generation, energy storage, static var compensation and flexible power transmission. Neutral Point Clamped (NPC) three-level inverter is a common inverter with three-level topological structure, including diode-clamped NPC, T-type NPC, Active Neutral Point Clamped (ANPC) and the like. FIG. 1A shows a three-phase diode-clamped NPC three-level topological structure, of which a DC side is a capacitance bridge arm consisting of two (groups) of capacitors connected in series and having a capacity of C, wherein the upper and lower capacitors may be formed of one or more capacitor devices. The three-level topological structure has a phenomenon of an unbalance of the neutral point voltage, i.e., the voltages of the upper and lower capacitors are not the same. The unbalance issue of the neutral point voltage is always difficult to be solved, and especially under the working conditions of pure reactive, unbalanced and non-linear AC load, the unbalance of the neutral point voltage on the DC side easily occurs. If this phenomenon is not suppressed, then an output voltage becomes poorer, and an output current becomes worse, causing a DC overvoltage or an AC overcurrent, and a shutdown with failure. Therefore, it is of great importance for wide application of the three-level topology to design a reasonable control method to suppress an unbalance of the neutral point voltage.

SUMMARY OF THE INVENTION

In order to solve the above problem, the present invention designs a control method for balancing neutral point voltage of a three-level circuit.

To be specific, the present invention relates to a control method for balancing neutral point voltage of a neutral point clamped three-level circuit, wherein the three-level circuit is for converting a DC voltage into a three-phase AC voltage, wherein the three-level circuit comprises a capacitance bridge arm including upper and lower capacitors connected in series and three switch bridge arms electrically connected to the capacitance bridge arm and being a, b and c phase switch bridge arms, respectively, each of the a, b and c phase switch bridge arms includes at least four switch devices to output a positive level, a zero level, or a negative level, characterized in that the method comprises:

step 11, obtaining a first neutral point voltage to represent a voltage difference between the upper and lower capacitors;

step 12, acquiring a first value range of a duty ratio of a zero level of x phase switch bridge arm through a modulating reference voltage of the x phase switch bridge arm and the DC voltage, wherein x represents a, b and c phase switch bridge arms included in the three-level circuit, and presetting a first set value of the duty ratio of zero level of the x phase switch bridge arm within the first value range;

step 13, when an absolute value of the first neutral point voltage is larger than a first threshold value, adjusting the first set value to be within the first value range, distributing a second set value for a duty ratio of the positive level of the x phase switch bridge arm and a third set value for a duty ratio of the negative level of the x phase switch bridge arm on the basis of the adjusted first set value, and modulating the switch devices of the x phase switch bridge arm according to the adjusted first, second and third set values, such that the absolute value of the first neutral point voltage is smaller than the first threshold value.

The present invention further relates to a three-level circuit for converting a DC voltage into a three-phase AC voltage, wherein the three-level circuit comprises a capacitance bridge arm including upper and lower capacitors connected in series and three switch bridge arms electrically connected the capacitance bridge arm and being a, b and c phase switch bridge arms, respectively, wherein each of the a, b and c phase switch bridge arms includes at least four switch devices to output a positive level, a zero level, or a negative level, and wherein the three-level circuit adopts a control method for balancing neutral point voltage of a three-level circuit.

The present invention further relates to a control method for balancing a neutral point voltage of a neutral point clamped three-level circuit, wherein the three-level circuit is for converting a DC voltage into a three-phase AC voltage and comprises a capacitance bridge arm including upper and lower capacitors connected in series and three switch bridge arms electrically connected the capacitance bridge arm and being a, b and c phase switch bridge arms, respectively, each of which includes at least four switch devices to output a positive level, a zero level, or a negative level, characterized in that it comprises:

step 21, obtaining a first neutral point voltage to represent a voltage difference between the upper and lower capacitors;

step 22, adjusting a first set value of a duty ratio of zero level of the x phase switch bridge arm, such that in a same switch period, when modulating reference voltages of the a, b and c phase switch bridge arms are different, duty ratios of the zero levels of the a, b and c phase switch bridge arms are different, wherein x represents the a, b and c phase switch bridge arms included in the three-level circuit;

step 23, distributing a second set value for a duty ratio of the positive level of the x phase switch bridge arm and a third set value for a duty ratio of the negative level of the x phase switch bridge arm on the basis of the first set value, and modulating the switch devices of the x phase switch bridge arm according to the first, second and third set values, such that an output voltage of the x phase switch bridge arm includes positive, negative and zero levels in at least one switch period, and an absolute value of the first neutral point voltage is smaller than a first threshold value.

The present invention further relates to a three-level circuit for converting a DC voltage into a three-phase AC voltage, wherein the three-level circuit comprises a capacitance bridge arm including upper and lower capacitors connected in series, and three switch bridge arms electrically connected the capacitance bridge arm and being a, b and c phase switch bridge arms, respectively, each of which includes at least four switch devices to output a positive level, a zero level, or a negative level, and wherein the three-level circuit adopts a control method for balancing a neutral point voltage of a three-level circuit.

In conclusion, as compared to the prior art, the three-level control method of the present invention can obtain an optimum performance of controlling an unbalance of the neutral point can be acquired and is convenient for implementing, such that it facilitates application of the three-level topology in various operating environments.

DETAILED DESCRIPTION OF THE PREFERRED EMBODIMENTS

The present invention is further described in detail below with reference to the drawings.

With respect to the phenomenon of an unbalance of the neutral point voltage, the conventional three-level control methods relate to space vector-based control methods and carrier-wave-based control methods. The space vector methods are complex in implementing, and are poor in modulation effect under the circumstance of large modulation degree and low power factor. A common used carrier-wave-based control method is zero sequence voltage injection, which is simple in implementing as compared to the space vector methods. However, the space vector methods and the zero sequence voltage injection are not suitable for a three-phase four-wire electrical system as the zero sequence voltage injection may cause neutral current out of control. In order to remedy some deficiencies of the existing algorithms, the present invention discloses a control method for balancing a neutral point voltage of a three-level circuit. But the present invention is not limited to be used in three-phase four-wire electrical system.

Figure 1A:
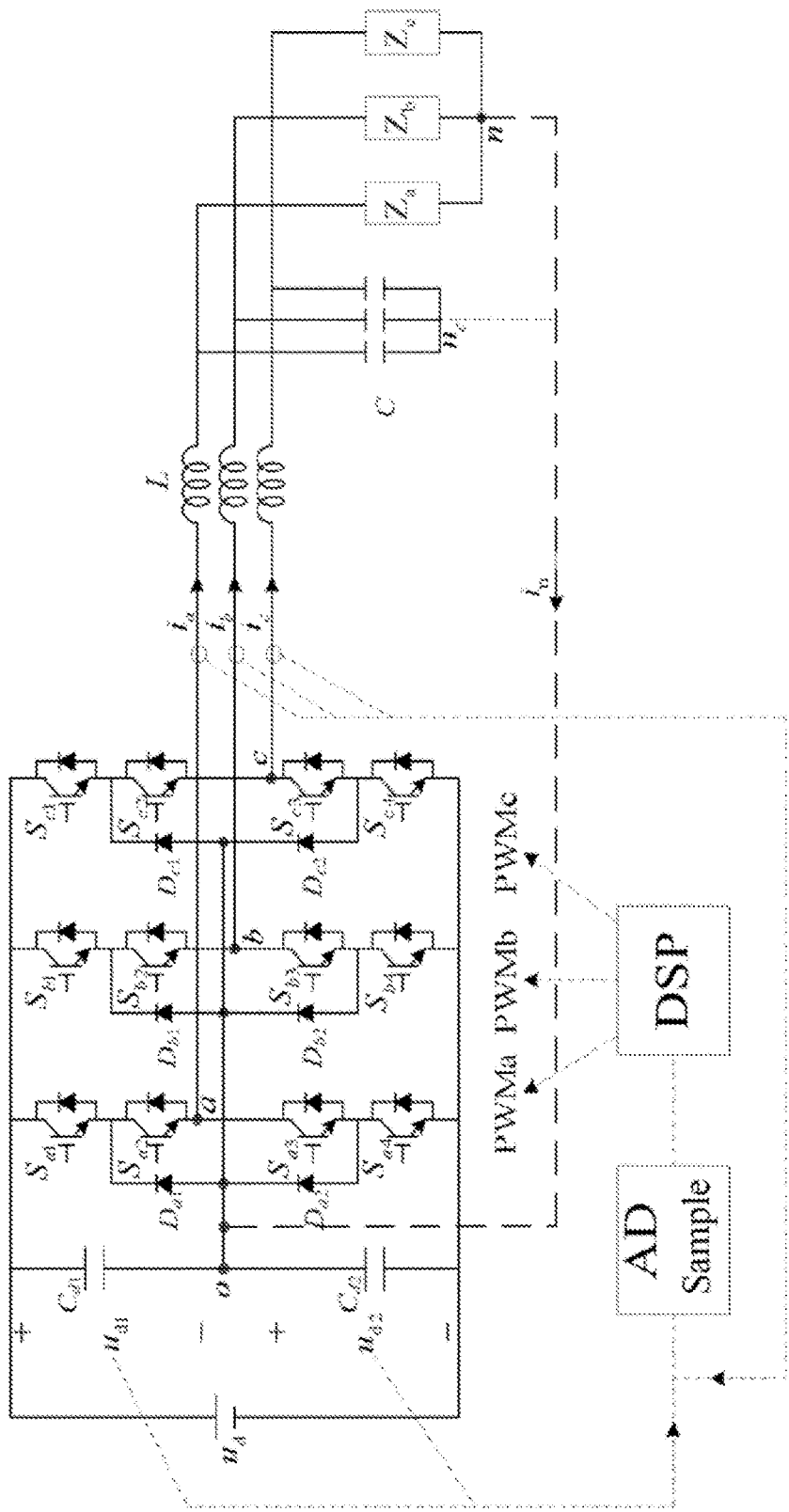
FIG. 1A is a topological diagram of a DNPC three-level circuit used in the embodiment of the present invention.

The hardware circuit topology suitable for the control method of the present invention may be a neutral point clamped three-level circuit, for example, a DNPC (Diode Neutral Point Clamped) three-level circuit topology shown in FIG. 1A. The three-level circuit is for converting a DC voltage into a three-phase AC voltage. The three-level circuit comprises a capacitance bridge arm on a DC side including upper and lower capacitors connected in series, and at least three switch bridge arms on an AC side, each of the switch bridge arms of the three-level circuit including at least four switch devices to output a positive level, a zero level, or a negative level. The upper and lower capacitors may include one or more capacitor devices, respectively. The present invention is not limited thereto. The upper and lower capacitors $C_{d1}$ and $C_{d2}$ may have the same capacity, and the phenomenon of unbalance of the neutral point voltage refers to the phenomenon that a voltage of the upper capacitor is not the same as a voltage of the lower capacitor.

Figure 2:
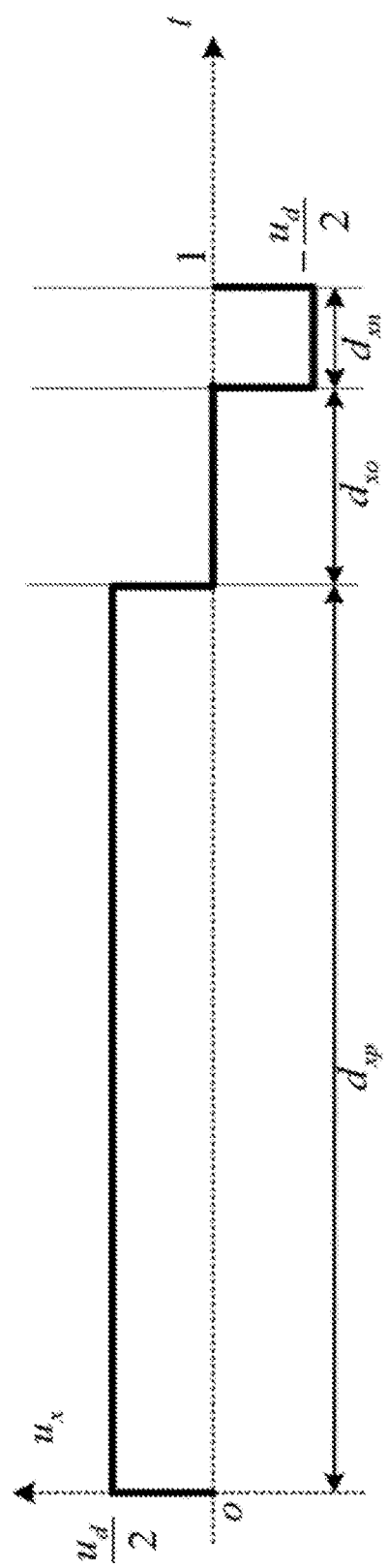
FIG. 2 is a schematic diagram of duty ratios of positive, negative and zero levels of x phase in the method of controlling a balance of a neutral point voltage of a three-level circuit in the embodiment of the present invention.

The switch bridge arms on the AC side of the NPC three-level circuit are referred to as a, b and c phases. A variant x represents one of the a, b and c phases, a duty ratio of the zero level of the x phase in a modulation period (or a switch period) T is $d_{xo}$, a duty ratio of the positive level is $d_{xp}$, a duty ratio of the negative level is $d_{xn}$, and a sum thereof is 1. As shown in FIG. 2, i.e., they satisfy:

$$d_{xo}+d_{xp}+d_{xn}=1 \quad (1)$$

$u_{xref}$ represents a modulating reference voltage of the x phase. The modulating reference voltage may be predesigned by the control system, and also may be obtained by receiving calculation of an external feedback, or by receiving an external instruction. $u_d$ represents a DC voltage. For example, as shown in FIG. 1A, $u_d$ may also equal to a sum of voltages of the upper and lower capacitors. According to the area equivalence principle, the duty ratios of the positive, negative and zero levels of each phase satisfy:

$$d_{xp}\frac{u_d}{2} - d_{xn}\frac{u_d}{2} + d_{xo} \times 0 = u_{xref} \quad (2)$$

When the duty ratio $d_{xo}$ of the zero level is zero, the three-level inverter is completely degraded to a two-level inverter, and does not have advantages of the three-level inverter such as small harmonic wave and small amplitude of level jump. The present invention does not set the duty ratio $d_{xo}$ of the zero level to be zero.

In the formulas (1) and (2), $d_{xo}$, $d_{xp}$ and $d_{xn}$ are three unknown numbers, and $d_{xo}>0$, $d_{xp} \geq 0$ and $d_{xn} \geq 0$, so the duty ratio $d_{xo}$ of the zero level is adjustable within a value range.

The neutral point voltage $u_o$ is often used to represent an unbalanced degree of the three-level circuit, and may be used to represent a voltage difference between the upper and lower capacitors. In the corresponding circuit topology shown in the figures, generally, the neutral point voltage $u_o$ satisfies a mathematic model:

$$2C\frac{du_o}{dt} = i_{NP} = \sum_{x=a,b,c}(d_{xo}i_x) - i_n \quad (3)$$

Right of the formula (3) is an average current $i_{NP}$ flowing out from the neutral point O of the capacitance bridge arm in one switch period, $i_x$ is an AC output current of the x phase bridge arm, the definition $i_x>0$ represents that the current flows from the inverter to the load, $i_x<0$ represents that the current flows from the load to the inverter, $i_n$ represents a current in a neutral wire, and if the neutral wire does not exist, $i_n=0$. According to the formula (3), the neutral point voltage $u_o$ can be adjusted by adjusting a size of the duty ratio $d_{xo}$ of the zero level, i.e., the duty ratio $d_{xo}$ of the zero level is adjusted to suppress the phenomenon of the unbalance of the neutral point voltage.

Figure 3A:
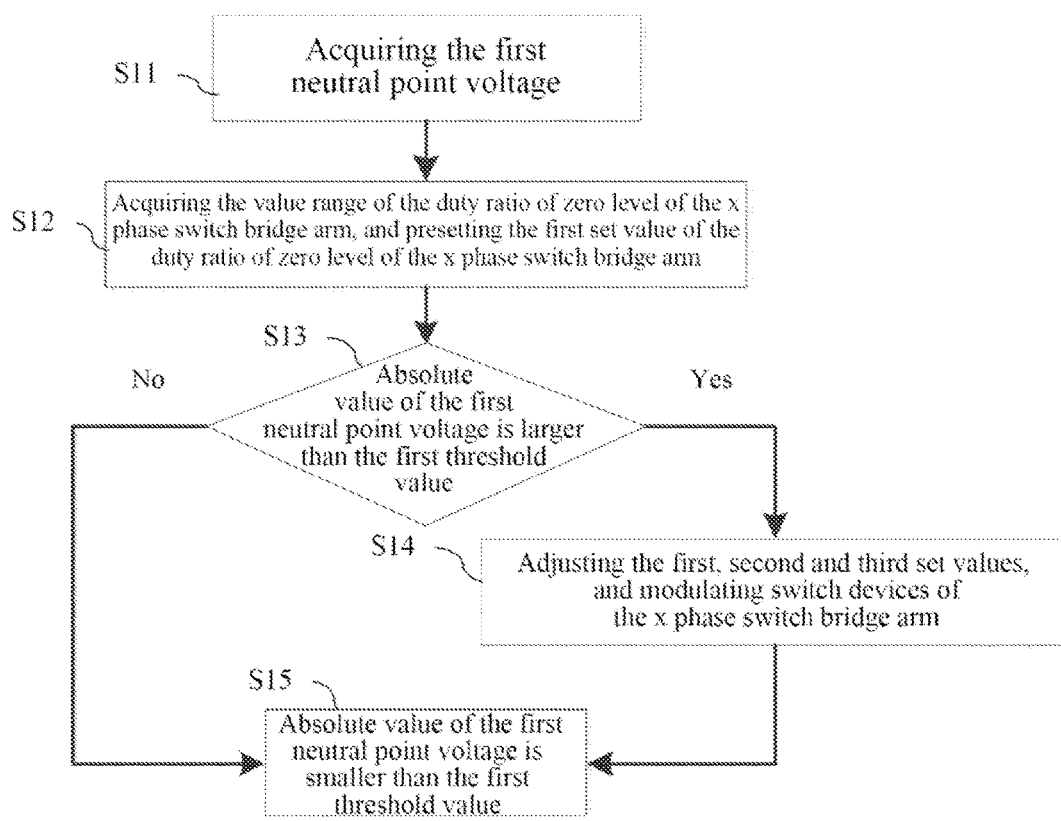
FIGS. 3A and 3B are flow charts of the first embodiment of the present invention.

FIG. 3A is a flow chart of the control method for balancing a neutral point voltage of a three-level circuit in the first embodiment of the present invention. Please refer to FIG. 3A, this embodiment comprises:

step S11, acquiring a first neutral point voltage $u_o$. The first neutral point voltage $u_o$ may be acquired through several methods, for example, sampling voltages $u_{d1}$ and $u_{d2}$ of the upper and lower capacitors on the DC end, and obtaining the first neutral point voltage $u_o=(u_{d1}-u_{d2})/2$. The first neutral point voltage $u_o$ may also be acquired through other method, for example, $u_o=u_{d1}-u_{d2}$, $u_o=u_d-2*u_{d2}$, etc., which can represent a voltage difference between the upper and lower capacitors, i.e., which represent the unbalanced degree of the three-level circuit;

step S12, acquiring a value range of the first set value $d_{xo}$ of a duty ratio of a zero level of x phase switch bridge arm through the modulating reference voltage $u_{xref}$ and the DC voltage $u_d$ of the x phase, and preselecting one value in the value range as a preset value of the first set value $d_{xo}$;

step S13, determining whether a balance of the first neutral point voltage $u_o$ has to be balance-controlled, particularly determining whether the first neutral point voltage $u_o$ is larger than a first threshold value $u_{th}$, and when an absolute value of the first neutral point voltage $u_o$ is smaller than the first threshold value $u_{th}$, it may be viewed that the first neutral point voltage $u_o$ reaches a balanced state. At this time, it may not be processed or may be controlled using the conventional zero sequence voltage injection. The present invention is not limited thereto. When the absolute value of the first neutral point voltage $u_o$ is larger than the first threshold value $u_{th}$, the balance of the first neutral point voltage $u_o$ is controlled according to subsequent control method;

step S14, when the absolute value of the first neutral point voltage $u_o$ is larger than the first threshold value $u_{th}$, adjusting the first set value $d_{xo}$ of the x phase within the first value range, the adjusted first set value being still within the first value range, distributing the second set value $d_{xp}$ of the duty ratio of the positive level of the x phase and the third set value $d_{xn}$ of the duty ratio of the negative level of the x phase on the basis of the adjusted first set value, and modulating switch devices of the x phase according to the adjusted first, second and third set values $d_{xo}$, $d_{xp}$ and $d_{xn}$ in one or more switch periods, so as to reduce the absolute value of the first neutral point voltage $u_o$;

step S15, when the absolute value of the first neutral point voltage $u_o$ is smaller than the first threshold value $u_{th}$, it may be viewed as reaching a balanced state of the first neutral point voltage $u_o$.

Figure 3B:
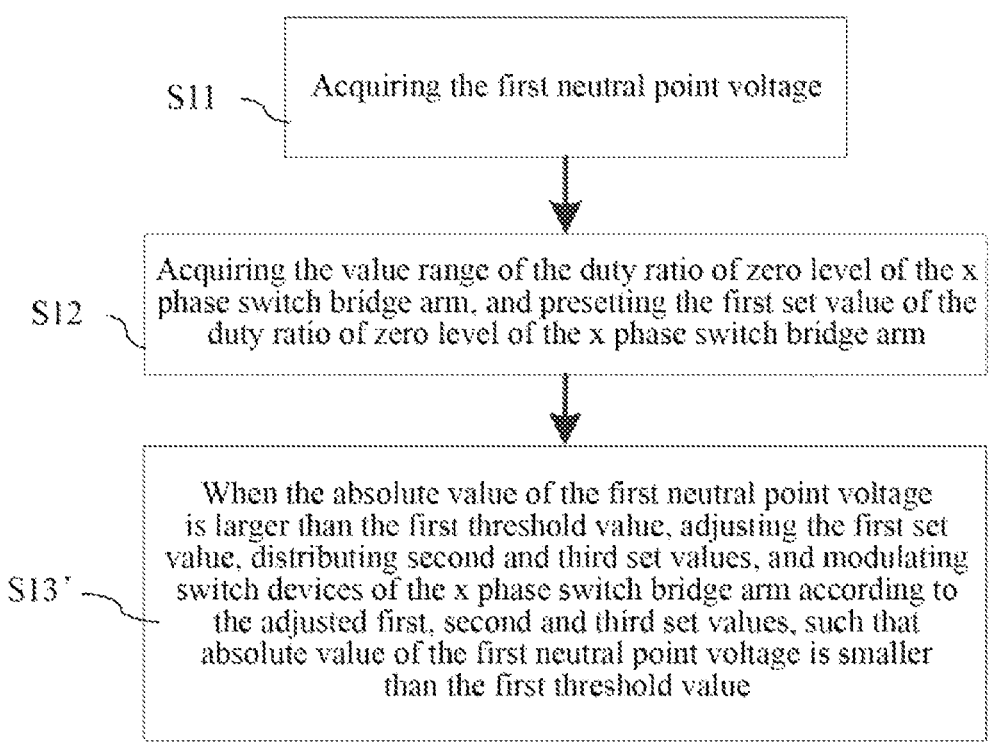

The above steps may be merged or split to be viewed still as the same method contents. For examples, the steps S13, S14 and S15, which are listed separately for convenience of expression, may be merged to one step S13', as shown in FIG. 3B, i.e., when the absolute value of the first neutral point voltage is larger than the first threshold value, adjusting the first set value to be within the first value range, distributing the second set value for the duty ratio of the positive level of the x phase switch bridge arm and the third set value for the duty ratio of the negative level of the x phase switch bridge arm on the basis of the adjusted first set value, and modulating switch devices of the x phase switch bridge arm according to the adjusted first, second and third set values, such that, in one or more cycles or even in the long run, the absolute value of the first neutral point voltage is smaller than the first threshold value.

Figure 4A:
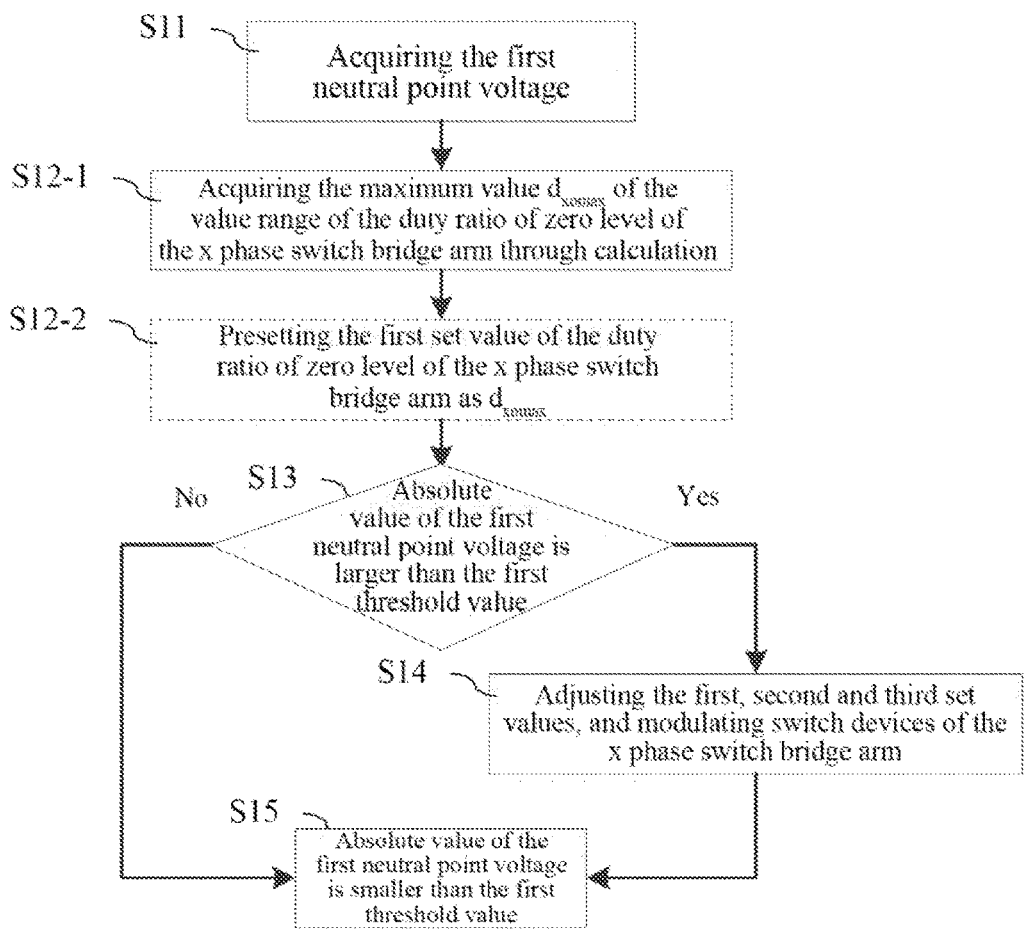
FIGS. 4A and 4B are flow charts of the second embodiment of the present invention.
Figure 4B:
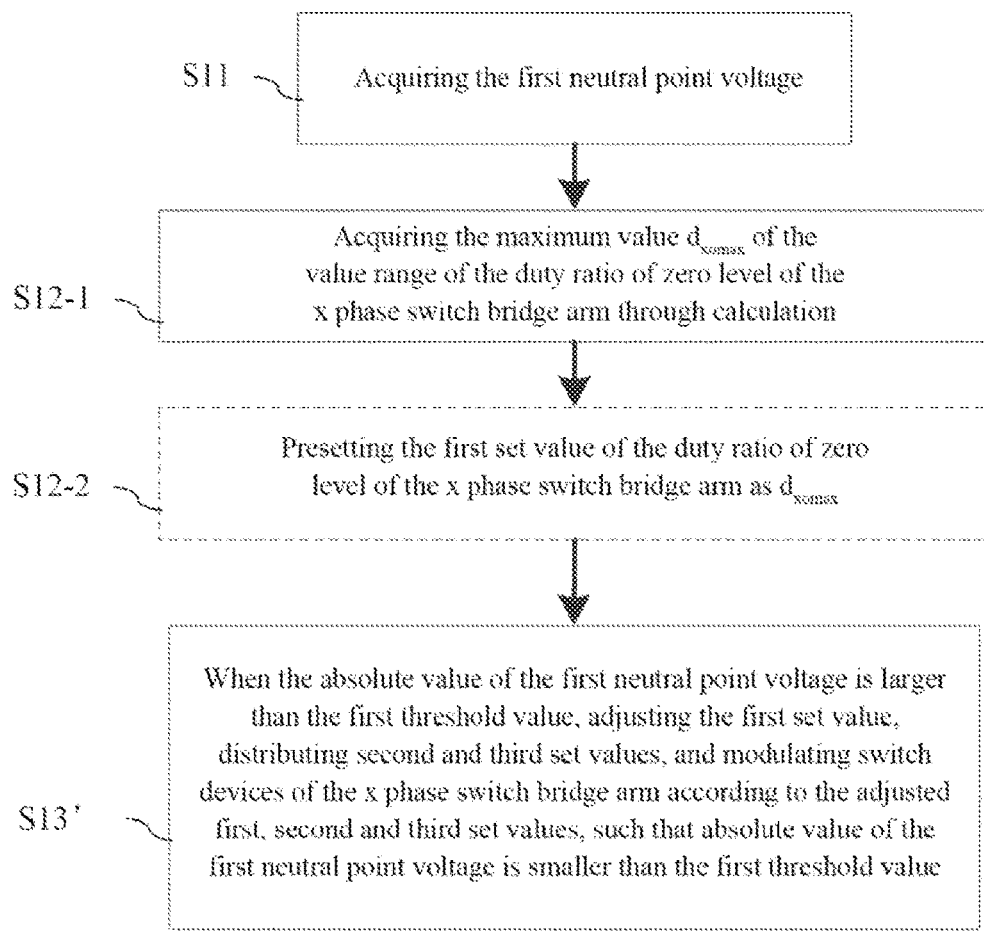

FIG. 4A is a flow chart of the control method for balancing a neutral point voltage of a three-level circuit according to the second embodiment of the present invention. Please refer to FIG. 4A, in this embodiment, the steps S11, S13, S14 and S15 are the same as the corresponding steps in the first embodiment, and the steps S13, S14 and S15 may also be merged to the step S13', as shown in FIG. 4B, so the details will not be described here. This embodiment differs from the first embodiment in executing step S12-1, specifically, i.e., acquiring the maximum value $d_{xomax}$ of the first value range (0, $d_{xomax}$] of the duty ratio $d_{xo}$ of the zero level of the x phase switch bridge arm using formula (4), after the step S11, i.e., after obtaining the first neutral point voltage $u_o$, $$d_{xomax} = 1 - \frac{|u_{xref}|}{0.5u_d} \quad (4)$$

wherein $u_{xref}$ is the modulating reference voltage of the x phase, $u_d$ is the DC voltage received on the DC side of the three-level circuit, then selecting one value in the acquired first value range (0, $d_{xomax}$] as a preset value of the first set value $d_{xo}$.

Another embodiment is a continuation of the second embodiment, as shown in the dashed box of FIG. 4A. As compared to the second embodiment, after the step S12-1 completes, i.e., after acquiring the maximum value $d_{xomax}$ in the first value range (0, $d_{xomax}$] of the duty ratio $d_{xo}$ of the zero level of the x phase switch bridge arm, step S12-2 is executed to preset the first set value $d_{xo}$ as the maximum value $d_{xomax}$ of the first value range. As compared to optionally select one value in the adjustable range as a preset value, on the basis of presetting the duty ratio $d_{xo}$ of the zero level as the maximum value $d_{xomax}$, decreasing the duty ratio $d_{xo}$ of the zero level may reduce switching time among the three levels, thereby reducing switch loss.

Figure 5:
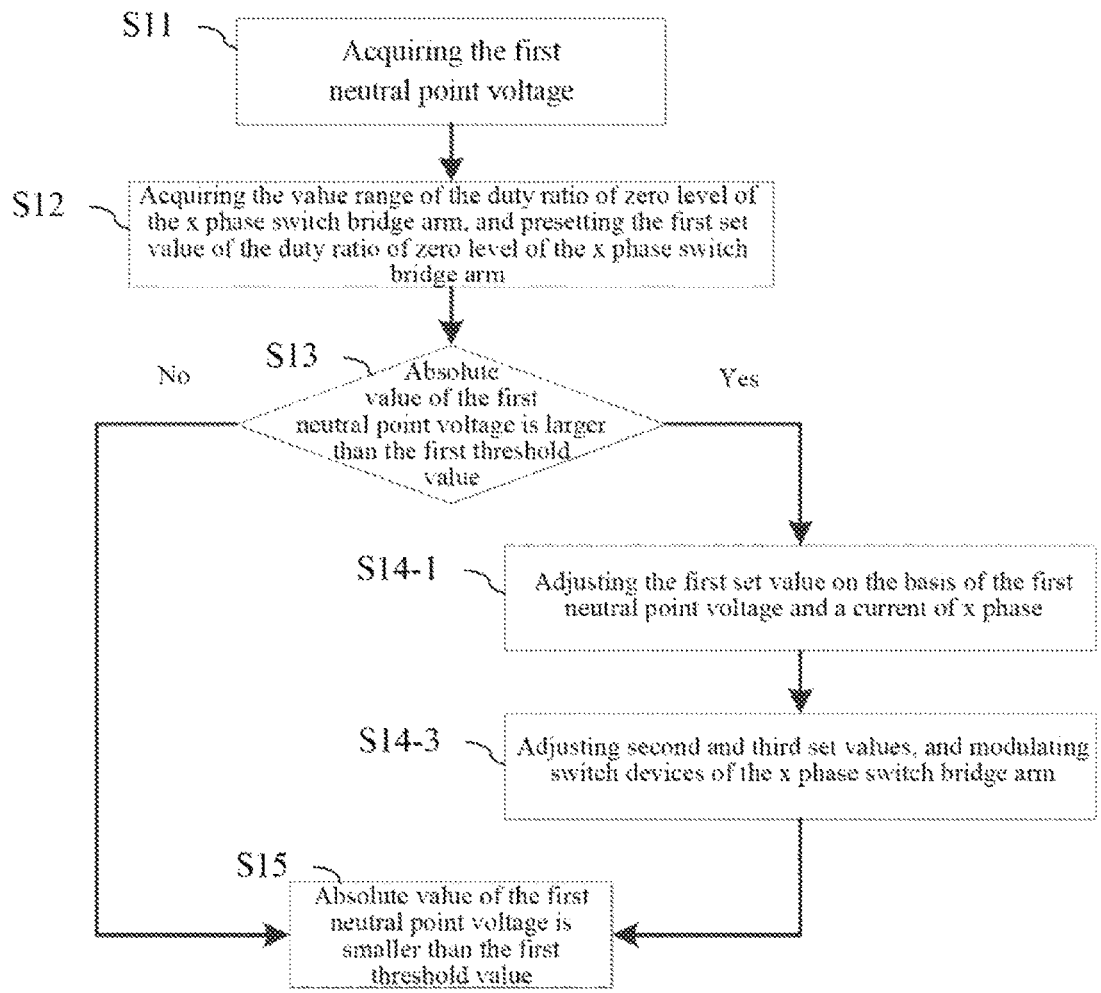
FIG. 5 is a flow chart of the third embodiment of the present invention.

FIG. 5 is a flow chart of the control method for balancing neutral point voltage of a three-level circuit according to the third embodiment of the present invention. Please refer to FIG. 5, in this embodiment, the steps S11, S12, S13 and S15 are the same as the corresponding steps in the first embodiment, and the steps S13, S14 and S15 may also be merged, so the details will not be described here. This embodiment differs from the first embodiment in that the step 14 may be further refined. When the first neutral point voltage $u_o$ is larger than the first threshold value $u_{th}$, step S14-1 is executed to adjust the first set value $d_{xo}$ of the duty ratio of the zero level of the x phase switch bridge arm on the basis of the first neutral point voltage and a flow direction of a current of the x phase, specifically, when it is determined that the voltage of the upper capacitor of the capacitance bridge arm is larger than the voltage of the lower capacitor: decreasing the first set value $d_{xo}$ of the duty ratio of the zero level of the x phase when the current of the x phase flows from the three-level circuit to the load, and increasing the first set value $d_{xo}$ of the duty ratio of the zero level of the x phase when the current of the x phase flows from the load to the three-level circuit; when the voltage of the upper capacitor of the capacitance bridge arm is smaller than the voltage of the lower capacitor: increasing the first set value $d_{xo}$ of the duty ratio of the zero level of the x phase when the current of the x phase flows from the three-level circuit to the load, and decreasing the first set value $d_{xo}$ of the duty ratio of the zero level of the x phase when the current of the x phase flows from the load to the three-level circuit; after the step S14-1, step S14-3 may be executed to distribute the second set value $d_{xp}$ of the x phase and the third set value $d_{xn}$ of the x phase on the basis of the adjusted first set value $d_{xo}$, and modulate the switch devices of the x phase switch bridge arm according to the adjust first, second and third set values $d_{xo}$, $d_{xp}$ and $d_{xn}$.

Figure 6:
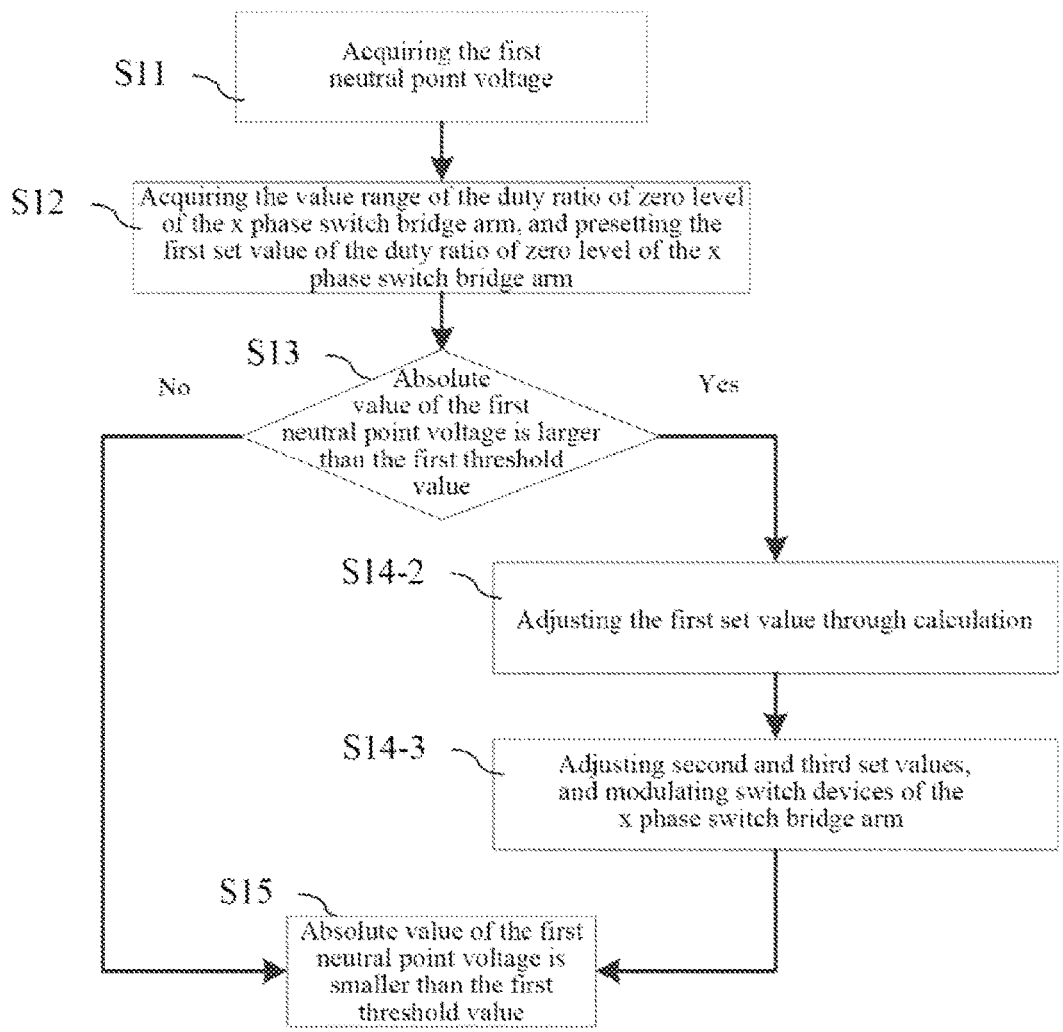
FIG. 6 is a flow chart of the fourth embodiment of the present invention.

FIG. 6 is a flow chart of the control method for balancing neutral point voltage of a three-level circuit according to the fourth embodiment of the present invention. Please refer to FIG. 6, in this embodiment, the steps S11, S12, S13 and S15 are the same as the corresponding steps in the first embodiment, and the steps S13, S14 and S15 may also be merged, so the details will not be described here. This embodiment differs from the first embodiment in that the step 14 may be further refined. When the first neutral point voltage $u_o$ is larger than the first threshold value $u_{th}$, step S14-2 may be executed to adjust the first set value $d_{xo}$ of the duty ratio of the zero level of the x phase switch bridge arm according to formula (5):

$$d_{xo} = \begin{cases} 1 - \frac{|u_{xref}|}{0.5u_d} - k_p u_o \text{sign}(i_x), & (u_o \text{ and } i_x \text{ have the same} \\ & \text{sign, and } |u_o| > u_{th}) \\ 1 - \frac{|u_{xref}|}{0.5u_d}, & \text{(others)} \end{cases} \quad (5)$$

Then, step S14-3 may be executed to distribute the second set value $d_{xp}$ of the x phase and the third set value $d_{xn}$ of the x phase on the basis of the adjusted first set value $d_{xo}$, and modulate the switch devices of the x phase switch bridge arm according to the adjusted first, second and third set values $d_{xo}$, $d_{xp}$ and $d_{xn}$.

In this embodiment, $k_p$ is a proportioncontrol parameter. The larger the proportioncontrol parameter $k_p$ is, the faster the speed for suppressing the unbalance will be. Generally, it is selected as a compromise betweenstability and rapidity of suppressing the neutral point voltage, so in some embodiments, it may be selected as $$k_p = \frac{C}{TI_m},$$

wherein $I_m$ is the maximum current allowed in the three-level circuit system. In addition, in some other embodiments, the first set value $d_{xo}$ of the duty ratio of the zero level may be further adjusted using, such as, proportional-integral and proportional-resonant controllers. These methods belong to the prior arts, so the details will not be described here.

The benefit of using the formula (5) is that, as compared to optically select one value in the adjustable range as a preset value, the preferable formula may decrease the duty ratio $d_{xo}$ of the zero level on the basis of presetting the duty ratio $d_{xo}$ of the zero level as the maximum value $d_{xomax}$, and when the output current $i_x$ of the x phase and the neutral point voltage $u_o$ have different signs, the duty ratio $d_{xo}$ of the zero level of the x phase may not change, such that only adjusting the duty ratio $d_{xp}$ of the positive level and the duty ratio $d_{xn}$ of the negative level of the x phase can reduce the switching times among the three levels, thereby reducing switch loss.

Figure 7:
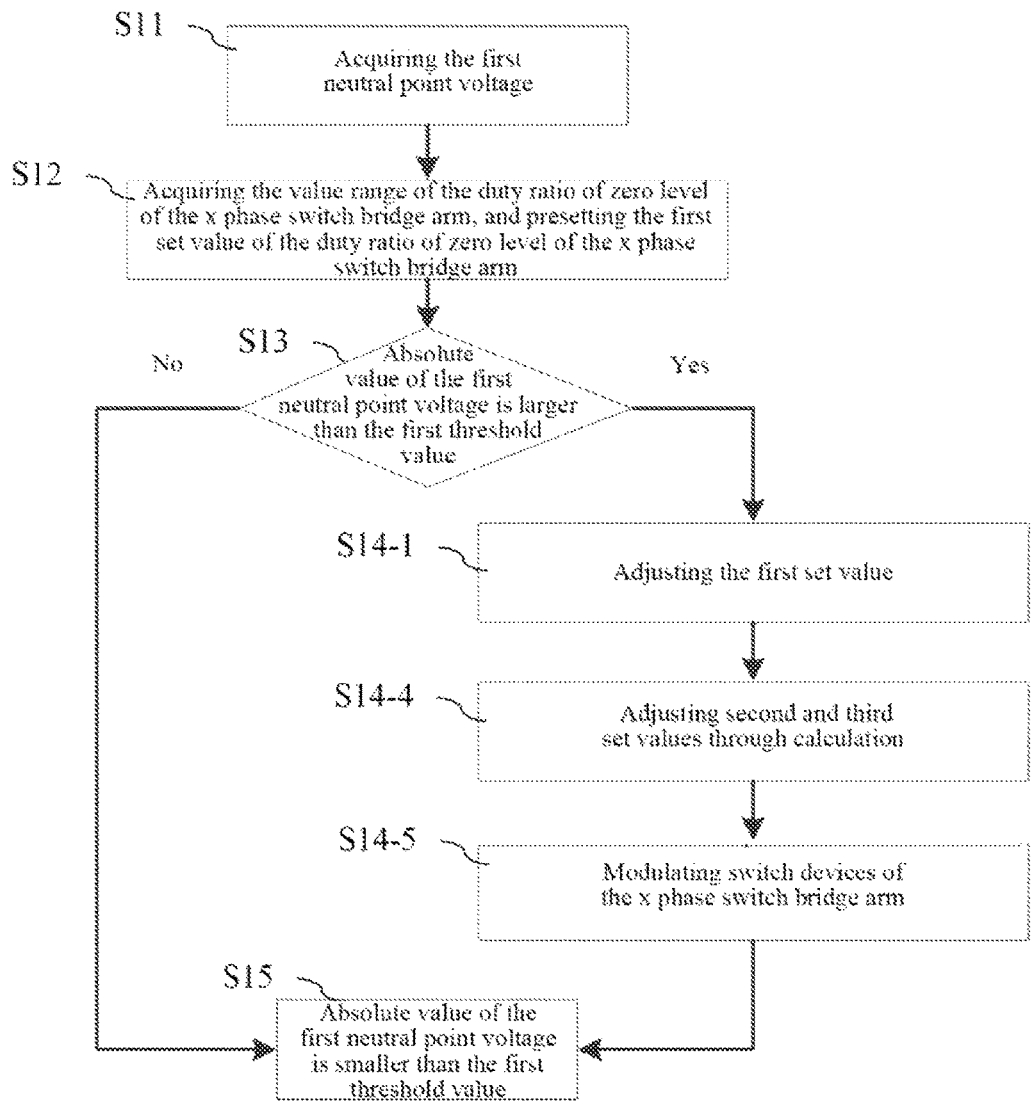
FIG. 7 is a flow chart of the fifth embodiment of the present invention.

FIG. 7 is a flow chart of the control method for balancing neutral point voltage of a three-level circuit according to the fifth embodiment of the present invention. Please refer to FIG. 7, in this embodiment, the steps S11, S12, S13, S14-1 and S15 are the same as the corresponding steps in the above embodiments, and the steps S13 to S15 may also be merged, so the details will not be described here. This embodiment differs from the first embodiment in that the step 14 may be further refined. After the step S14-1, i.e., after adjusting the first set value $d_{xo}$ of the duty ratio of the zero level of the x phase switch bridge arm, step S14-4 is executed to distribute the second set value $d_{xp}$ of the duty ratio of the positive level of the x phase switch bridge arm and the third set value $d_{xn}$ of the duty ratio of the negative level of the x phase switch bridge arm according to the area equivalence principle through formula (6), $$d_{xp} = \left(0.5 + \frac{u_{xref}}{u_d}\right) - 0.5 d_{xo} \quad (6)$$

$$d_{xn} = \left(0.5 - \frac{u_{xref}}{u_d}\right) - 0.5 d_{xo}$$

After the step S14-4, step S14-5 may be executed to modulate the switch devices of the x phase switch bridge arm according to the adjusted first, second and third set values $d_{xo}$, $d_{xp}$ and $d_{xn}$.

Figure 9:
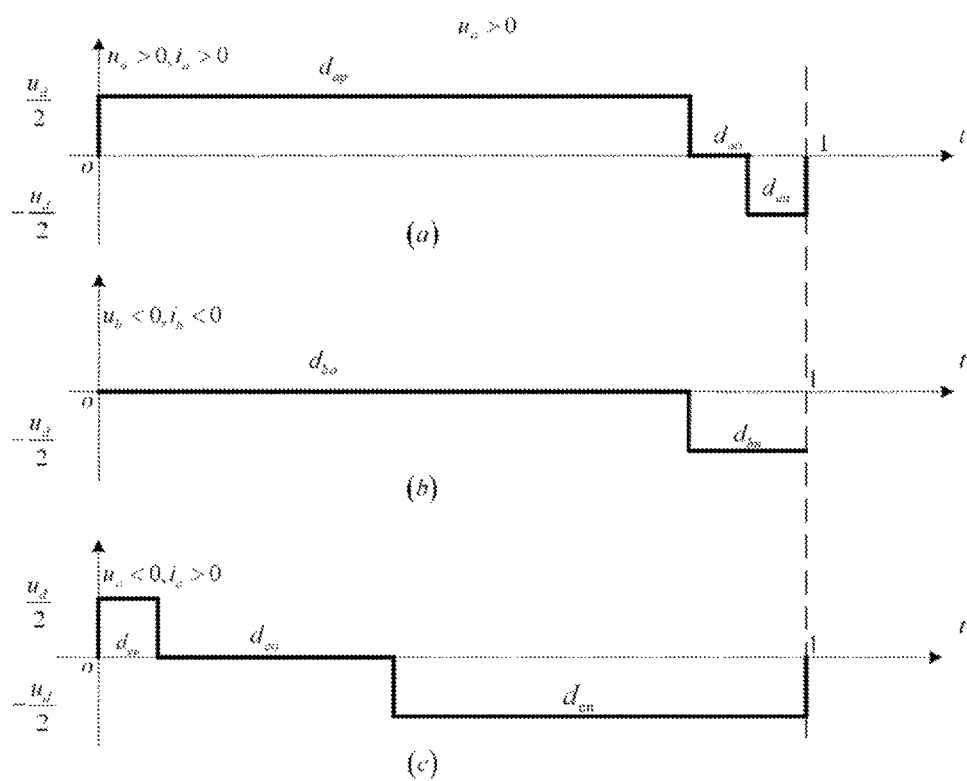
FIG. 9 is a schematic diagram when output voltages of two of the a, b and c phase switch bridge arms include the positive level, the negative level and the zero level in one switch period of the sixth embodiment of the present invention.

When using the methods in respective embodiments of the present invention, on the basis of the different first set value, and the different distributed second and third set values, an output voltage of at least one bridge arm may include a positive level, a negative level and a zero level in at least one switch period, as shown in (a) and (c) of FIG. 9, where output voltages of the two bridge arms include positive, negative and zero levels in one switch period. As also can be seen from FIG. 9, in one to more switch periods, when the modulating reference voltages of the a, b and c phases are different, the duty ratios of the zero levels of the a, b and c phases are different. These features may also be further described in the form of method steps.

Figure 8:
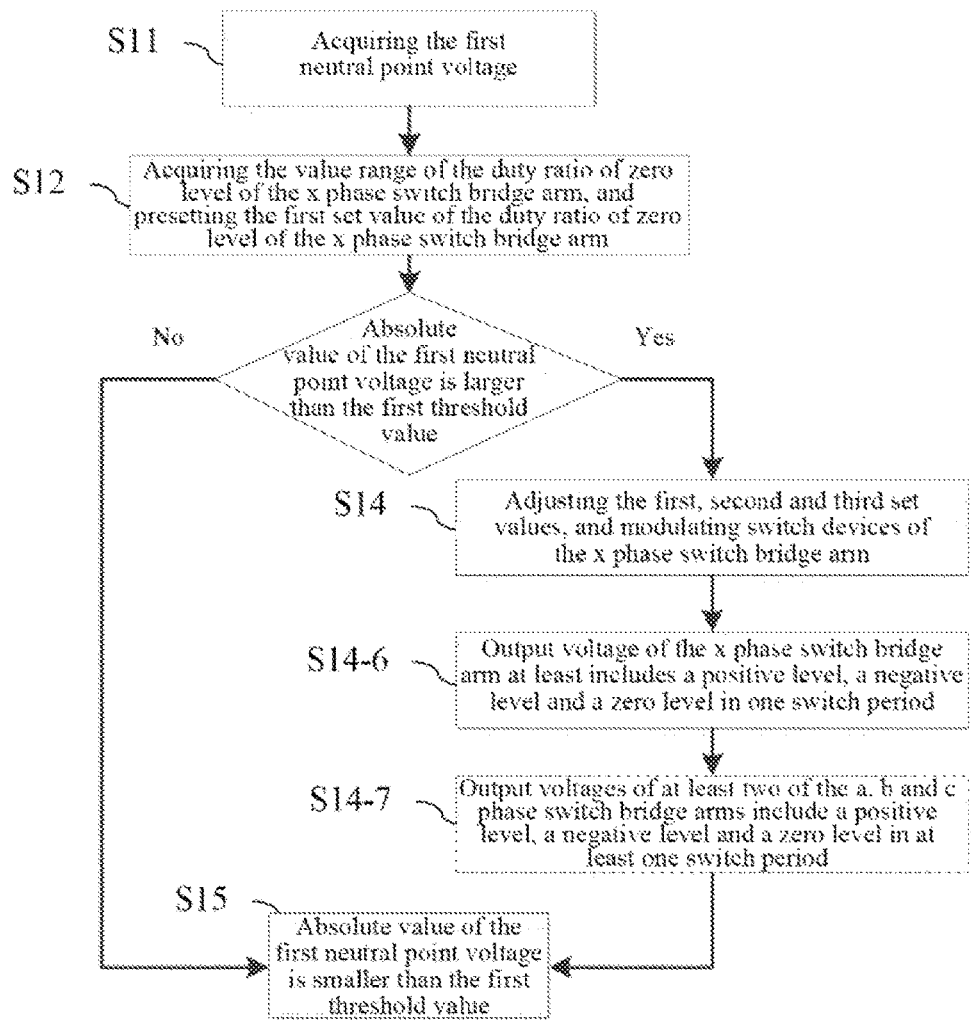
FIG. 8 is a flow chart of the sixth embodiment of the present invention.

FIG. 8 is a flow chart of the control method for balancing neutral point voltage of a three-level circuit according to the sixth embodiment of the present invention. Please refer to FIG. 8, in this embodiment, the steps S11, S12, S13, S14 and S15 are the same as the corresponding steps in the first embodiment, so the details will not be described here. In one switch period, after the step S14, when the first neutral point voltage $u_o$ is larger than the first threshold value $u_{th}$, the first set value $d_{xo}$ is adjusted, the second set value $d_{xp}$ and the third set value $d_{xn}$ are distributed on the basis of the adjusted first set value $d_{xo}$, and the switch devices of the x phase switch bridge arm are modulated correspondingly. As described in step S14-6, the adjusted first, second and third set values $d_{xo}$, $d_{xp}$ and $d_{xn}$ of the x phase switch bridge arm do not equal to zero, such that the output voltage of the x phase switch bridge arm includes the positive level, the negative level and the zero level in at least one switch period. Further, the sized embodiment is continued in the seventh embodiment. As shown in the dashed box of FIG. 8, after the step S14-6, i.e., when the adjusted first, second and third set values $d_{xo}$, $d_{xp}$ and $d_{xn}$ of the x phase switch bridge arm do not equal to zero, such that the output voltage of the x phase switch bridge arm includes the positive level, the negative level and the zero level in at least one switch period, as described in step S14-7, output voltages of at least two of the a, b and c phase switch bridge arms including the x phase switch bridge arm of the three-level circuit include the positive level, the negative level and the zero level in at least one switch period, and the results are shown in FIG. 9.

In addition, the control method for balancing neutral point voltage of a three-level circuit disclosed in the above embodiments of the present invention modulates by use of positive, negative and zero levels, such that the duty ratio of the zero level of the x phase voltage is adjustable, suppresses the unbalance of the neutral point with the adjustable zero level, may not inject the zero sequence voltage, and may be applied to a three-phase three wire system and a three-phase four wire system. In some embodiments of the present invention, when the unbalanced degree of the neutral point is low, zero sequence voltage injection may also be adopted, such that the present invention produces more significant technical effect in the three-phase three wire electrical system, such as, reducing switching times, reducing loss, etc.

Figure 10A:
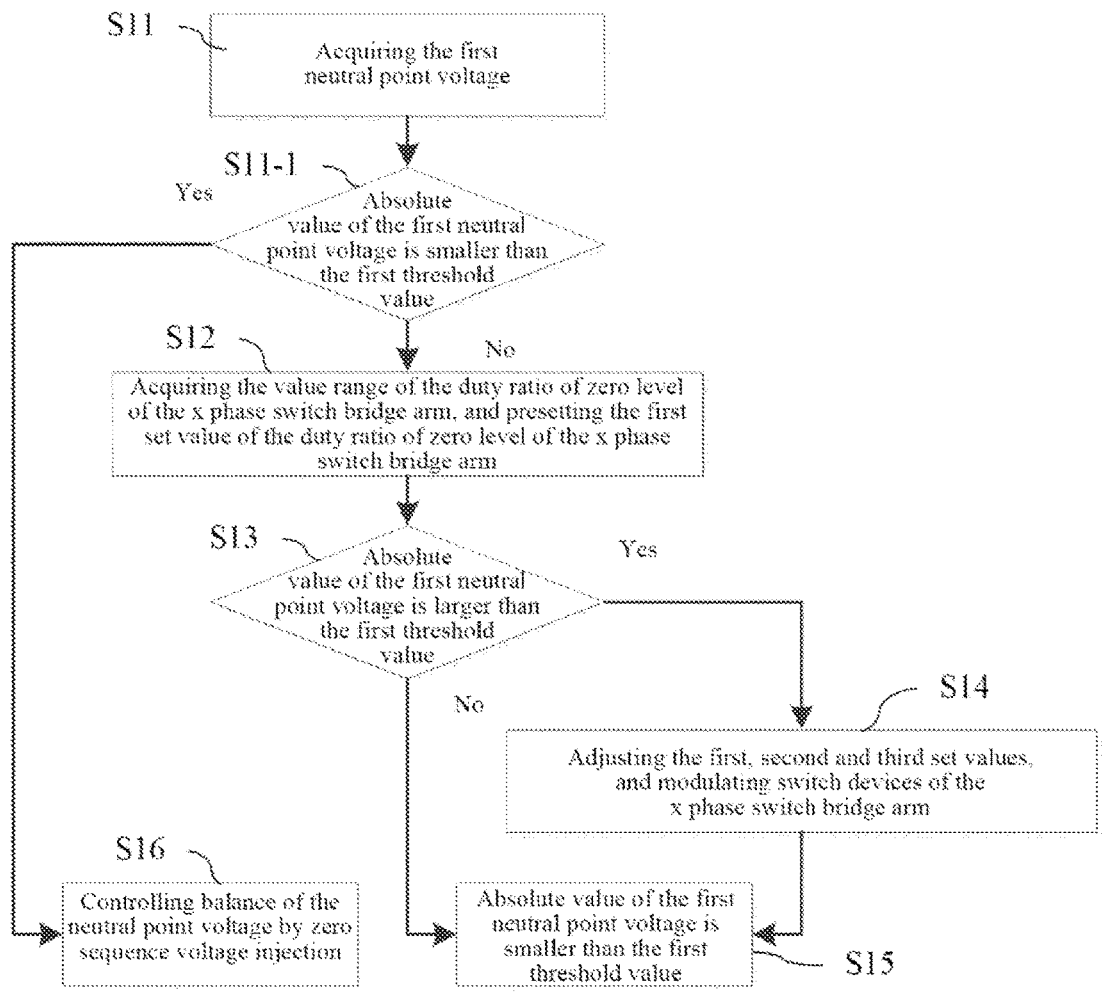
FIGS. 10A and 10B are flow charts of the eighth embodiment of the present invention.
Figure 10B:
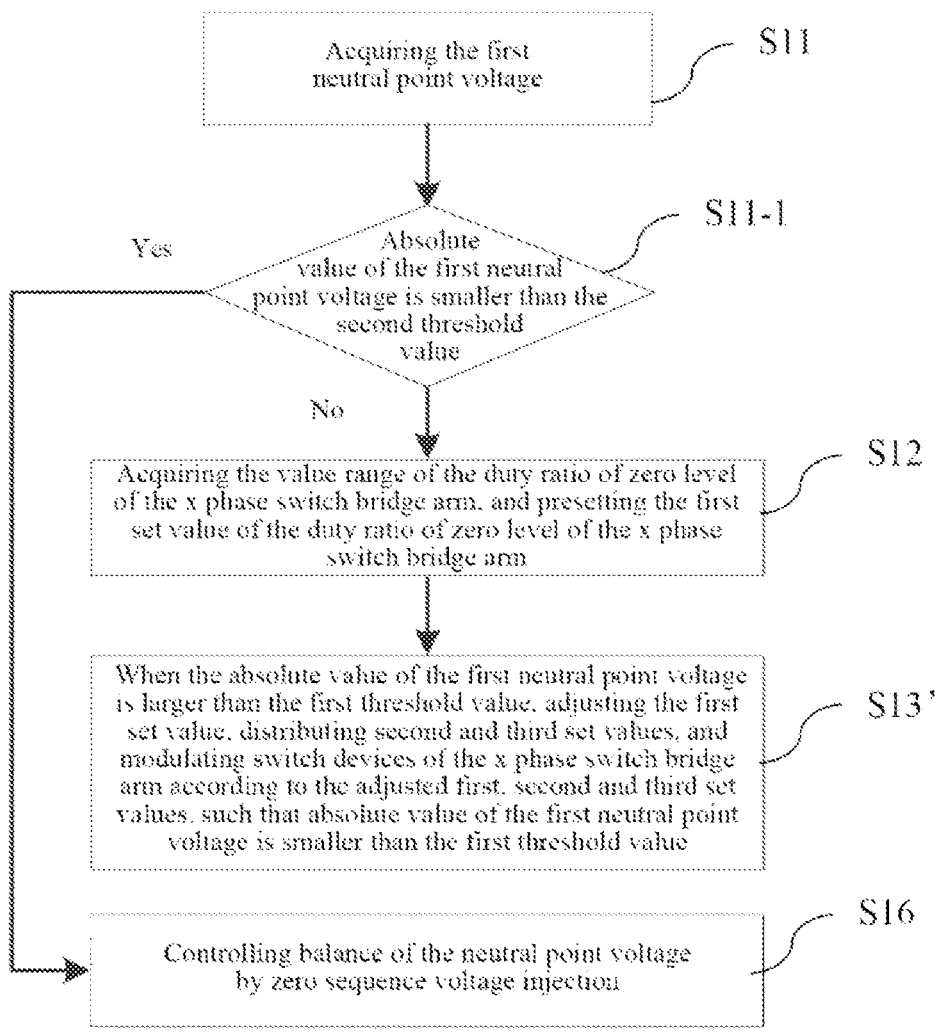

FIG. 10A is a flow chart of the control method for balancing neutral point voltage of a three-level circuit according to the eighth embodiment of the present invention. In this embodiment, the steps S11, S12, S13, S14 and S15 are the same as the corresponding steps in the first embodiment, and the steps S13, S14 and S15 may also be merged to the step S13', as shown in FIG. 10B, so the details will not be described here. This embodiment differs from the first embodiment in executing step S11-1 to set a second threshold value after obtaining the first neutral point voltage $u_o$ in the step S11. If the first neutral point voltage $u_o$ is larger than the second threshold value, the step S12 is executed, and if the first neutral point voltage $u_o$ is smaller than the second threshold value, and the unbalanced degree of the neutral point is low, step S16 is executed to inject the zero sequence voltage to control the balance of the neutral point voltage. Generally speaking, the second threshold value is smaller than or equals to the first threshold value in the step S13. In particular, when the second threshold value equals to the first threshold value, the step S11-1 may be further merged to the step S13; when the first neutral point voltage $u_o$ is smaller than the first threshold value, the step S16 is executed to inject the zero sequence voltage; and when the first neutral point voltage $u_o$ is larger than the first threshold value, the step S14 is executed. Since the zero sequence voltage may be injected, this embodiment is suitable for the three-phase three wire electrical system. The zero sequence voltage injection in this embodiment belongs to the prior art, so the details will not be described here.

Figure 11A:
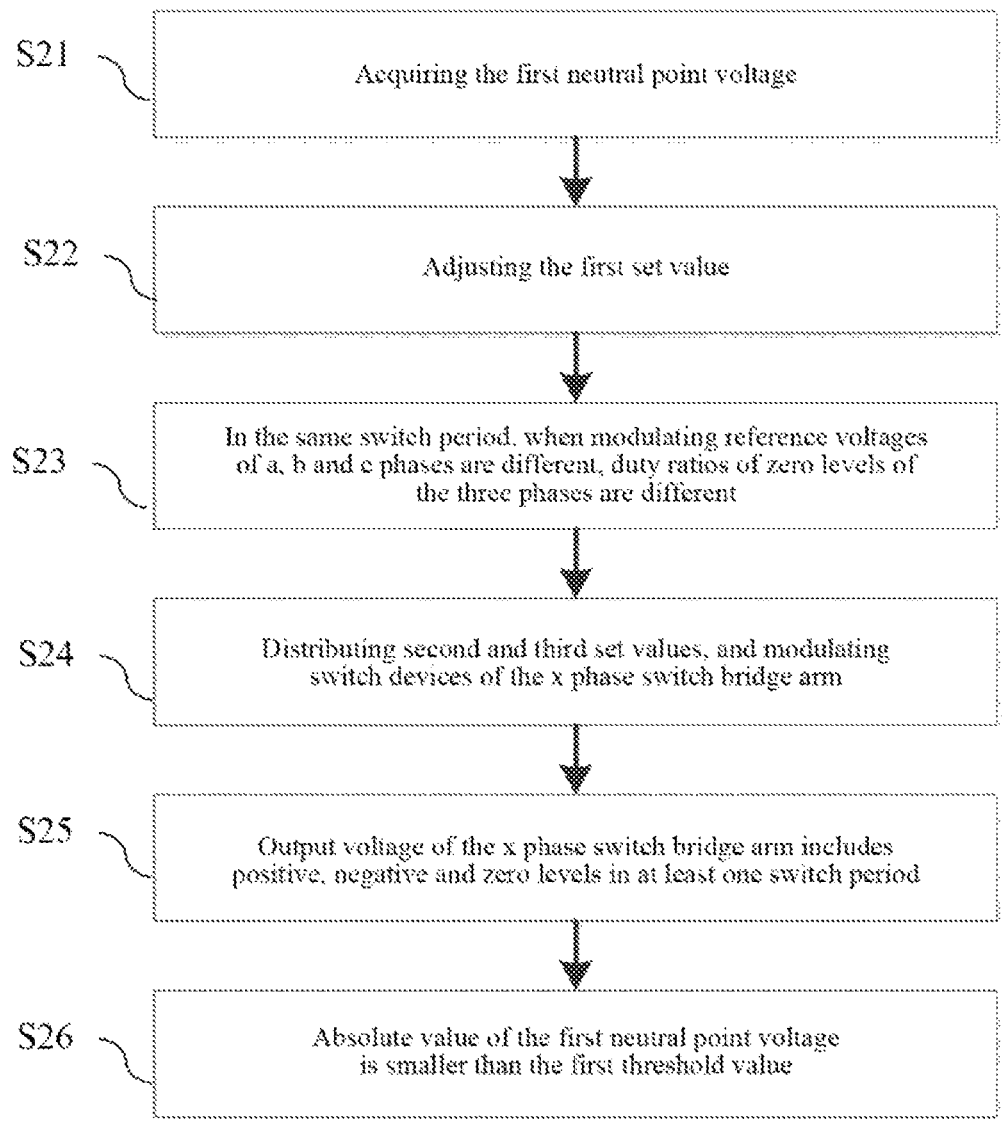
FIGS. 11A and 11B are flow charts of the ninth embodiment of the present invention.
Figure 12B:
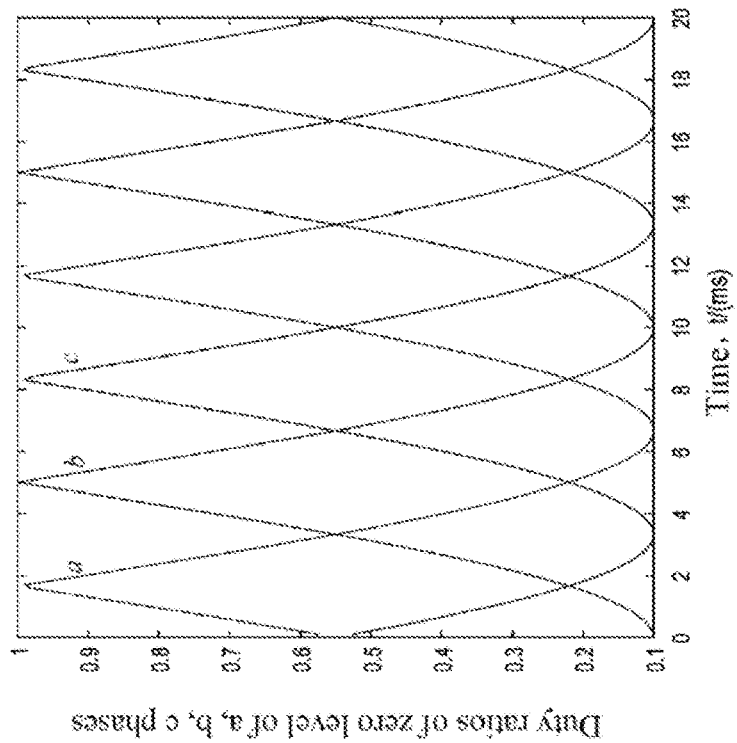
FIG. 12B is a schematic diagram of changes of the duty ratios of the zero levels of the a, b and c phase switch bridge arms in the ninth embodiment of the present invention.
Figure 12A:
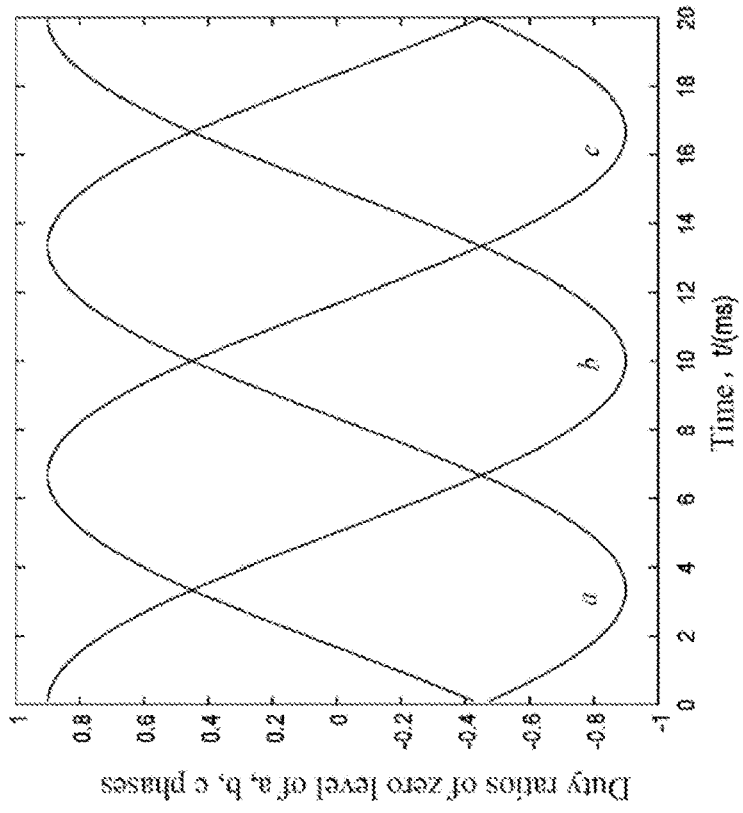
FIG. 12A is a schematic diagram of changes of modulating reference voltages of the a, b and c phase switch bridge arms in the ninth embodiment of the present invention.

FIG. 11A is a flow chart of the control method for balancing neutral point voltage of a three-level circuit according to the ninth embodiment of the present invention. As shown in FIG. 11A, this embodiment comprises:

step S21, obtaining a first neutral point voltage representing a voltage difference between the upper and lower capacitors, wherein the first neutral point voltage $u_o$ may be acquired through several methods, so the details will not be described here;

step S22, adjusting the first set value $d_{xo}$ of the duty ratio of the zero level of the x phase switch bridge arm according to a value range of the duty ratio of the zero level of the x phase switch bridge arm. For example, the first set value $d_{xo}$ of the duty ratio of the zero level of the x phase switch bridge arm may be adjusted on the basis of the first neutral point voltage and a flow direction of a current of the x phase. To be specific, when the voltage of the upper capacitor of the capacitance bridge arm is larger than the voltage of the lower capacitor: decreasing the first set value $d_{xo}$ of the duty ratio of the zero level of the x phase when the current of the x phase flows from the three-level circuit to the load, and increasing the first set value $d_{xo}$ of the duty ratio of the zero level of the x phase when the current of the x phase flows from the load to the three-level circuit; when the voltage of the upper capacitor of the capacitance bridge arm is smaller than the voltage of the lower capacitor: increasing the first set value $d_{xo}$ of the duty ratio of the zero level of the x phase when the current of the x phase flows from the three-level circuit to the load, and decreasing the first set value $d_{xo}$ of the duty ratio of the zero level of the x phase when the current of the x phase flows from the load to the three-level circuit;

step S23, adjusting the first set value $d_{xo}$ in the same switch period, such that when the modulating reference voltages $u_{aref}$, $u_{bref}$ and $u_{cref}$ of the a, b and c phases are different, as shown in FIG. 12A, the duty ratios of the zero levels of the three phases in this switch period are different, as shown in FIG. 12B. The steps S22 and S23 are listed separately for convenience of expression, and may be merged to one step;

step S24, distributing the second set value $d_{xp}$ of the duty ratio of the positive level of the x phase switch bridge arm and the third set value $d_{xn}$ of the duty ratio of the negative level of the x phase switch bridge arm on the basis of the first set value $d_{xo}$, and modulating the switch devices of the x phase switch bridge arm correspondingly; for example, according to the area equivalence principle, the second set value $d_{xp}$ of the duty ratio of the positive level of the x phase switch bridge arm and the third set value $d_{xn}$ of the duty ratio of the negative level of the x phase switch bridge arm may be distributed through formula (6), and then step S25 is executed;

step S25, making an output voltage of the x phase switch bridge arm to include positive, negative and zero levels in at least one switch period, which means $d_{xp}$, $d_{xn}$, and $d_{xo}$ do not equal to zero in such switch period(s);

step S26, making an absolute value of the first neutral point voltage to be smaller than a first threshold value.

Figure 11B:
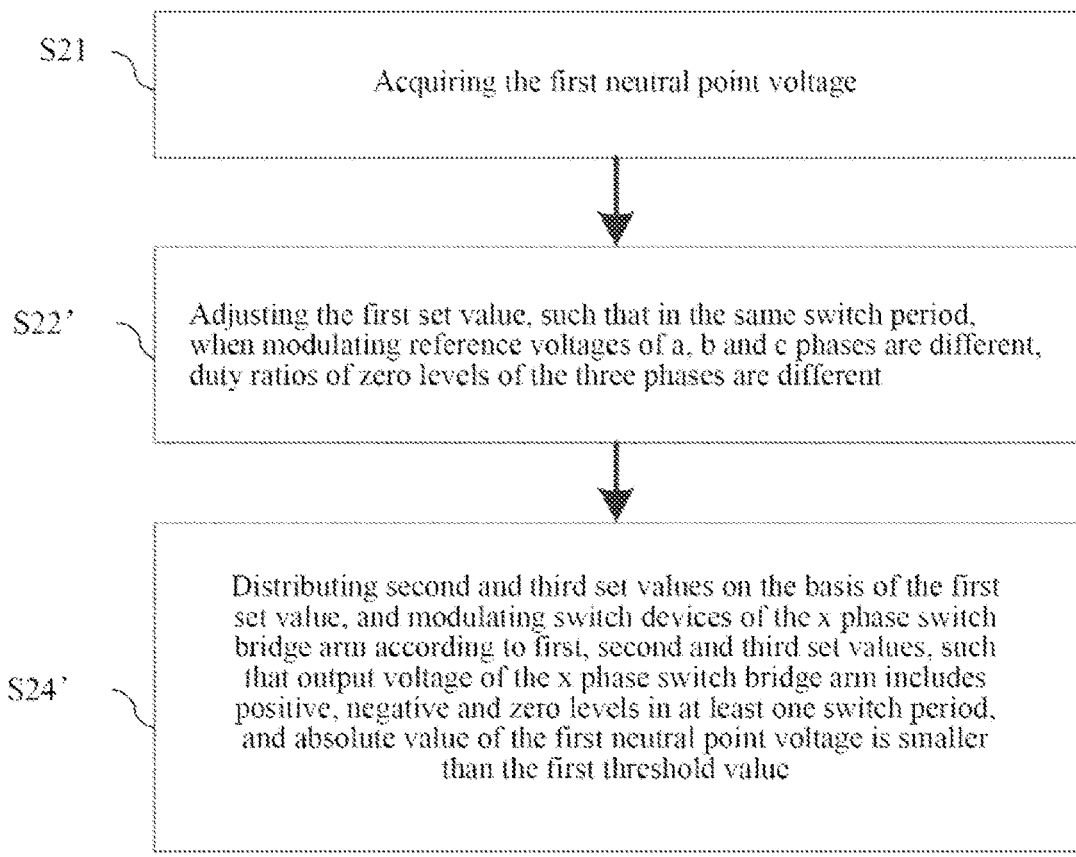

The steps S22 and S23 are listed separately for convenience of expression, and may be merged to step S22', and the steps S24, S25 and S26 may also be merged to step S24', as shown in FIG. 11B. For example, the second set value of the duty ratio of the positive level of the x phase switch bridge arm and the third set value of the duty ratio of the negative level of the x phase switch bridge arm are distributed on the basis of the first set value, and the switch devices of the x phase switch bridge arm are modulated according to the first, second and third set values, such that an output voltage of the x phase switch bridge arm includes positive, negative and zero levels in at least one switch period, and an absolute value of the first neutral point voltage is smaller than a first threshold value.

Figure 13A:
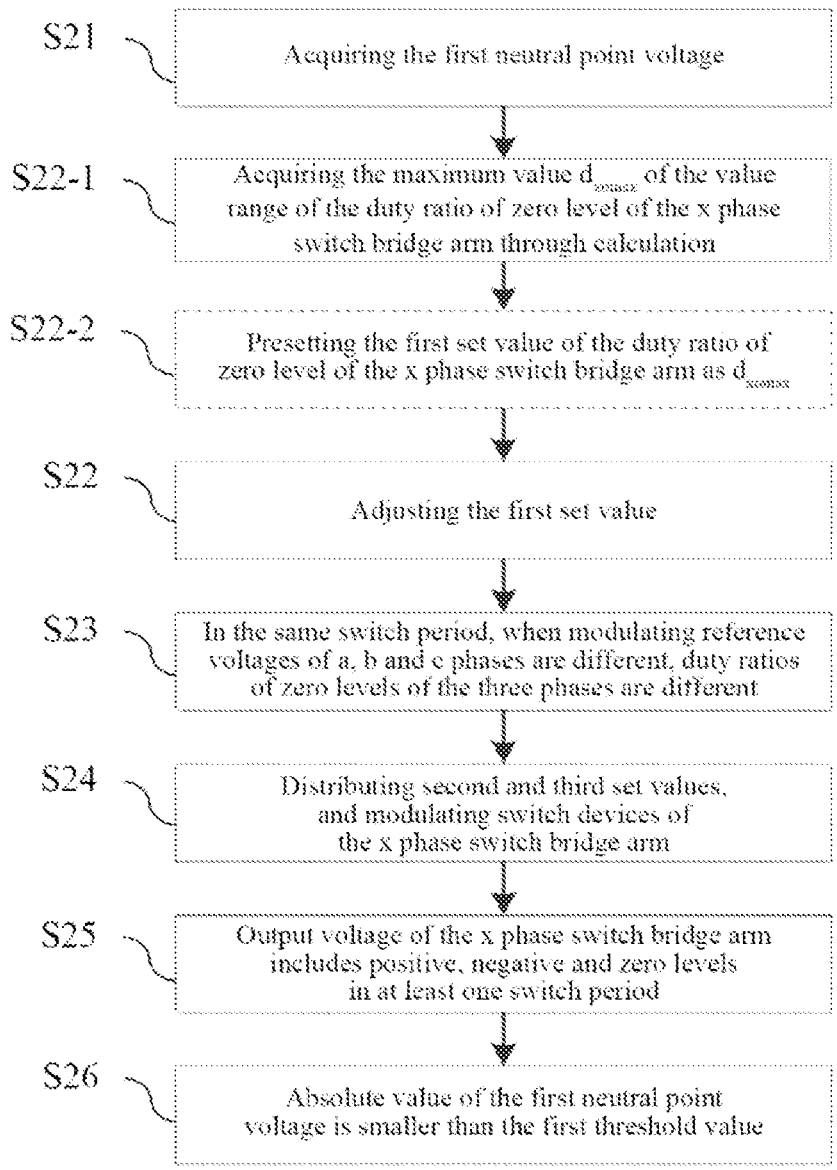
FIGS. 13A and 13B are flow charts of the tenth embodiment of the present invention.
Figure 13B:
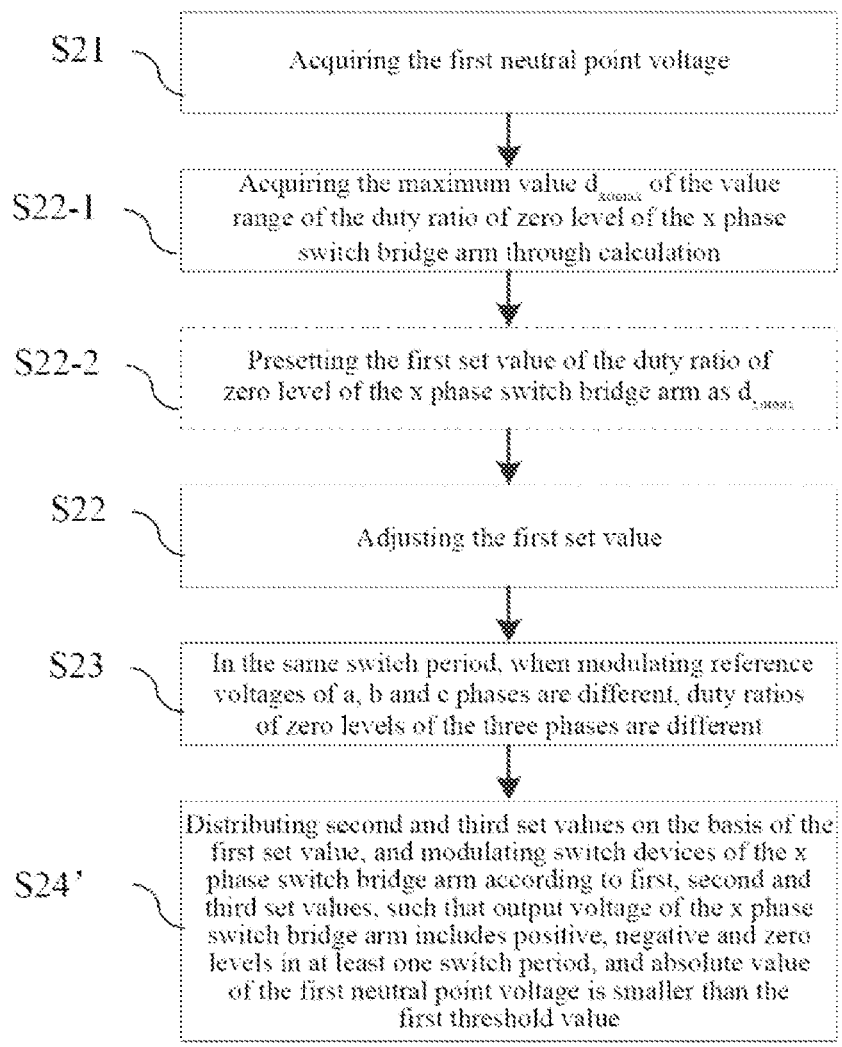

FIG. 13A is a flow chart of the control method for balancing neutral point voltage of a three-level circuit according to the tenth embodiment of the present invention. Please refer to FIG. 13A, in this embodiment, the steps S21, S23, S24, S25 and S26 are the same as the corresponding steps in the ninth embodiment, the steps S22 and S23 may be merged, and the steps S24, S25 and S26 may also be merged to the step S24', as shown in FIG. 13B, so the details will not be described here. This embodiment differs from the ninth embodiment in that the step S22 may be further refined. Specifically, step S22-1 acquires the maximum value $d_{xomax}$ of the first value range $(0, d_{xomax}]$ of the duty ratio $d_{xo}$ of the zero level of the x phase switch bridge arm by use of the above formula (4), thereby selecting one value in the acquired first value range $(0, d_{xomax}]$ as a preset value of the first set value $d_{xo}$, and then the step S23 is executed.

Another embodiment is a continuation of the tenth embodiment, as shown in the dashed box of FIG. 13A. As compared to the tenth embodiment, after the step S22-1 completes, i.e., after acquiring the maximum value $d_{xomax}$ of the first value range $(0, d_{xomax}]$ of the duty ratio $d_{xo}$ of the zero level of the x phase switch bridge arm, it further comprises step S22-2 to preset the first set value $d_{xo}$ as the maximum value $d_{xomax}$ of the first value range, and then the step S23 is executed.

Figure 14A:
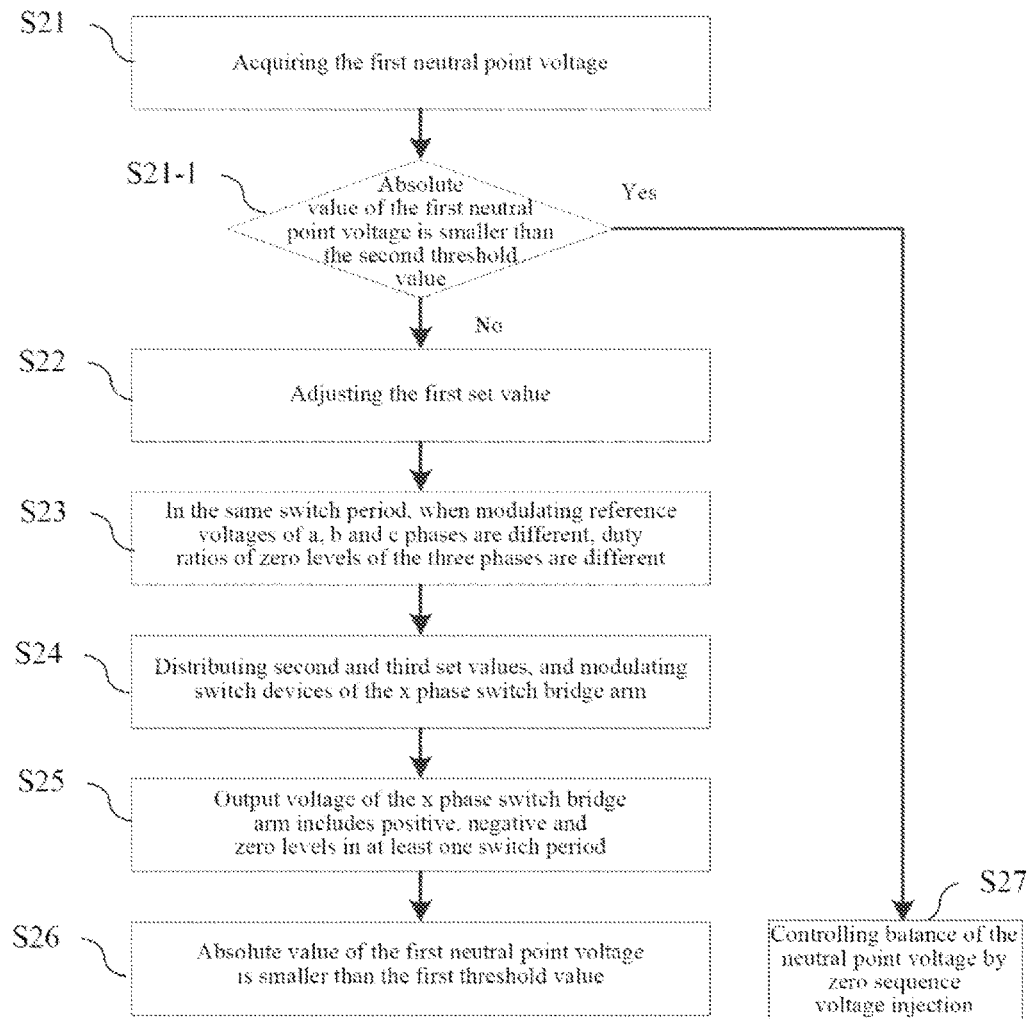
FIGS. 14A and 14B are flow charts of the eleventh embodiment of the present invention.
Figure 14B:
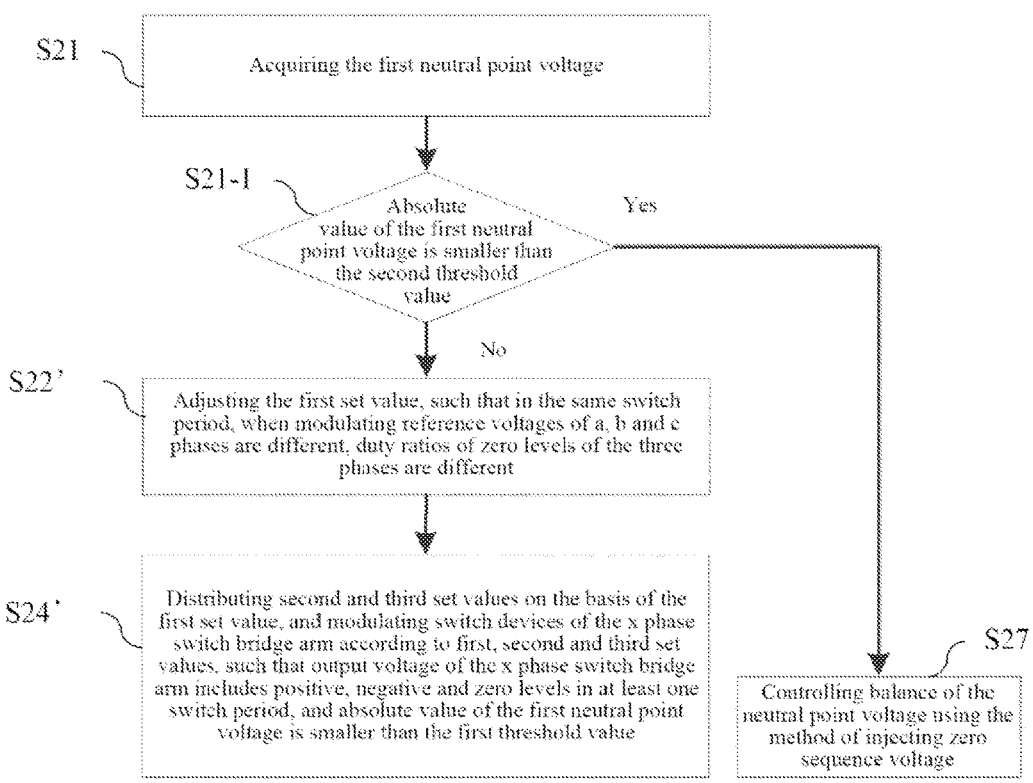

FIG. 14A is a flow chart of the control method for balancing neutral point voltage of a three-level circuit according to the eleventh embodiment of the present invention. Please refer to FIG. 14A, in this embodiment, the steps S21, S22, S23, S24, S25 and S26 are the same as the corresponding steps in the ninth embodiment, the steps S22 and S23 may be merged to the step S22', and the steps S24, S25 and S26 may also be merged to the step S24', as shown in FIG. 14B, so the details will not be described here. This embodiment differs from the ninth embodiment in that the step S21-1 may be executed to set a second threshold value after obtaining the first neutral point voltage $u_o$ in the step S21. If the first neutral point voltage $u_o$ is larger than the second threshold value, the step S22 is executed, and if the first neutral point voltage $u_o$ is smaller than the second threshold value, step S27 may be executed to inject the zero sequence voltage to control the balance of the neutral point voltage. The method of this embodiment is suitable for a three-phase three wire electrical system. The zero sequence voltage injection in this embodiment belongs to the prior art, so the details will not be described here.

The control method for balancing neutral point voltage of a three-level circuit disclosed in respective embodiments of the present invention is suitable for a three-level circuit, which is for converting a DC voltage into a three-phase AC voltage and comprises a capacitance bridge arm including upper and lower capacitors connected in series, and three switch bridge arms electrically connected the capacitance bridge arm and being a, b and c phase switch bridge arms, respectively, each of which includes at least four switch devices to output a positive level, a zero level, or a negative level. According to specific applications of different embodiments, the three-level circuit may be applied to a three-phase four wire electrical system, and also may be applied to a three-phase three wire electrical system.

In one embodiment, the three-level circuit is connected to a LC filter including at least three filter capacitors in star connection, and a neutral point of connection of the filter capacitors is electrically connected to a connection point of the upper and lower capacitors of the three-level circuit.

In one embodiment, the three-level circuit further comprises a fourth switch bridge arm electrically connected to the capacitance bridge arm and having the same topology as the a, b and c phase switch bridge arms.

To be specific, the control method for balancing neutral point voltage of a three-level circuit disclosed in the embodiments is suitable for a plurality of NPC (neutral point clamped) three-level circuits, as shown in FIGS. 1A, 1B, 1C and 1D. FIG. 1A illustrates a DNPC three-level circuit topology in one embodiment, of which the capacitance bridge arm includes an upper capacitor $C_{d1}$ and a lower capacitor $C_{d2}$ connected in series, a first end of the upper capacitor is electrically connected to a first DC input end, a second end of the upper capacitor is electrically connected to a neutral point level end, a first end of the lower capacitor is electrically connected to the neutral point level end, and a second end of the lower capacitor is electrically connected to a second DC input end; the first and second DC input ends of the capacitance bridge arm are electrically connected to the input voltage $u_d$ on the DC side; it further comprises a, b and c switch bridge arms to output a positive level or a zero level or a negative level. Taking the a phase switch bridge arm for example, the a phase switch bridge arm has four switch devices, and these switch devices in this embodiment are IGBT, which are respectively $S_{a1}$, $S_{a2}$, $S_{a3}$, $S_{a4}$, and two clamped diodes, which are respectively $D_{a1}$, $D_{a2}$, wherein $S_{a1}$, $S_{a2}$, $S_{a3}$ and $S_{a4}$ are connected to the capacitance bridge arm in parallel after being sequentially connected in series, $D_{a1}$ and $D_{a2}$ are connected to $S_{a2}$ and $S_{a3}$ in parallel after being sequentially connected in series, connecting ends of $D_{a1}$ and $D_{a2}$ are electrically connected to a neutral point (i.e., a neutral point level end) O of the capacitance bridge arm, and connecting ends of $S_{a2}$ and $S_{a3}$ are AC output ends of the a phase switch bridge arm. The b and c phase switch bridge arms may have the same structure as the a phase switch bridge arm, as shown in FIG. 1A, the switch devices and the diodes of the b phase switch bridge arm are shown by $S_{b1}$, $S_{b2}$, $S_{b3}$, $S_{b4}$, and $D_{m}$, $D_{b2}$, and the switch devices and the diodes of the c phase switch bridge arm are shown by $S_{c1}$, $S_{c2}$, $S_{c3}$, $S_{c4}$, and $D_{c1}$, $D_{c2}$. In other words, any one of the a, b and c phase switch bridge arms includes a first switch device, a second switch device, a third switch device, a fourth switch device, a first diode and a second diode; a first end of the first switch device is electrically connected to the first end of the upper capacitor, a second end of the first switch device is electrically connected to a first end of the second switch device, a second end of the second switch device is electrically connected to a first end of the third switch device, a second end of the third switch device is electrically connected to a first end of the fourth switch device, a second end of the fourth switch device is electrically connected to the second end of the lower capacitor; an anode of the first diode and a cathode of the second diode are electrically connected to the neutral point level end, a cathode of the first diode is electrically connected to the second end of the first switch device, and an anode of the second diode is electrically connected to the second end of the third switch device.

In some embodiment, the DNPC three-level circuit topology shown in FIG. 1A further comprises an analog-to-digital sampling module and a digital signal processing module for signal sampling and PWM generation. Please refer to FIG. 1A, the analog-to-digital sampling module is for collecting parameters of the voltage $u_{d1}$ of upper capacitor, the voltage $u_{d2}$ of the lower capacitor, the output voltage $i_x$ of the x phase and the like, and the digital signal processing module is for modulating an instruction of driving the switch devices of the x phase switch bridge arm.

In some embodiments, the DNPC three-level circuit topology shown in FIG. 1A further comprises a LC filter. Please refer to FIG. 1A, the LC filter includes at least three filter capacitors C in star connection, and an inductor L on the AC output end of each phase. Neutral point of connection $n_c$ of these filter capacitors C may be electrically connected to the neutral point level end O and applied to the three-phase four wire electrical system, and may also not be connected and applied to the three-phase three wire electrical system. However, the present invention is not limited thereto. For example, the three-phase four wire electrical system may also electrically connect the neutral point n of the load Z to the neutral point level end O.

Figure 1B:
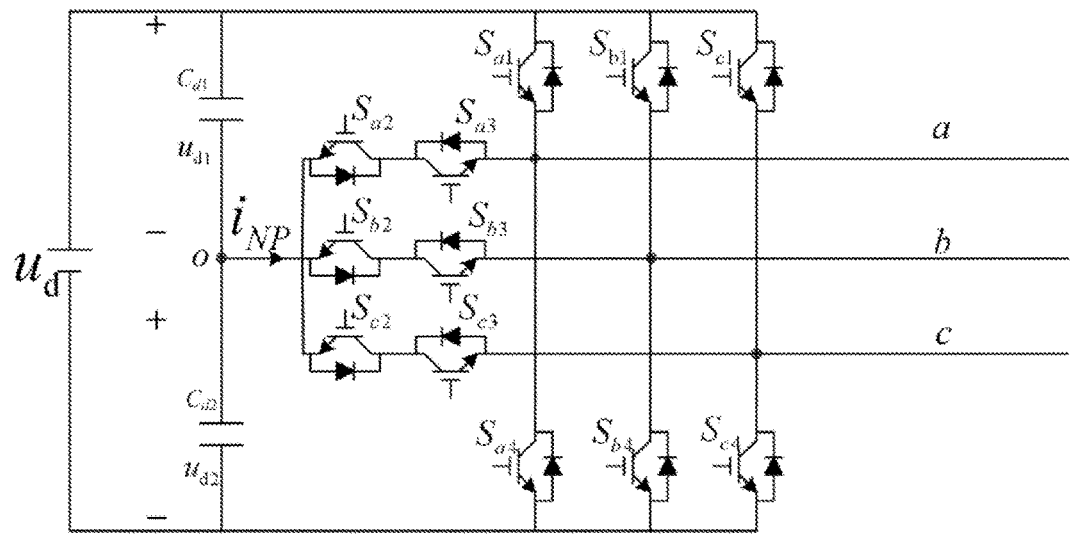
FIG. 1B is a topological diagram of a T-type NPC three-level circuit used in the embodiment of the present invention.

The control method for balancing neutral point voltage of a three-level circuit disclosed in the embodiment may also be applied to a T-type three-level circuit topology, as shown in FIG. 1B, of which the capacitance bridge arm is the same as the DNPC three-level circuit topology, and further comprises a, b and c switch bridge arms. Taking the a phase bridge arm for example, the a phase bridge arm has four switch devices, for example, IGBT, which are respectively $S_{a1}$, $S_{a2}$, $S_{a3}$, $S_{a4}$, wherein $S_{a1}$ and $S_{a4}$ are connected to the capacitance bridge arm in parallel after being sequentially connected in series, and after $S_{a2}$ and $S_{a3}$ are connected in series reversely, one end is electrically connected to the neutral point level end O, the other end is electrically connected to connecting ends of $S_{a1}$ and $S_{a4}$, and the connecting ends of $S_{a1}$ and $S_{a4}$ are AC output ends of the a phase switch bridge arm. The b and c phase switch bridge arms may have the same structure as the a phase switch bridge arm, as shown in FIG. 1B, the switch devices of the b phase switch bridge arm are shown by $S_{b1}$, $S_{b2}$, $S_{b3}$, $S_{b4}$, and the switch devices of the c phase switch bridge arm are shown by $S_{c1}$, $S_{c2}$, $S_{c3}$, $S_{c4}$. In other words, any one of the a, b and c phase switch bridge arms includes a first switch device, a second switch device, a third switch device and a fourth switch device; a first end of the first switch device is electrically connected to the first end of the upper capacitor, a second end of the first switch device is electrically connected to a first end of the fourth switch device and a second end of the third switch device, a first end of the second switch device is electrically connected to a first end of the third switch device, a second end of the second switch device is electrically connected to the neutral point level end, and a second end of the fourth switch device is electrically connected to the second end of the lower capacitor.

Figure 1C:
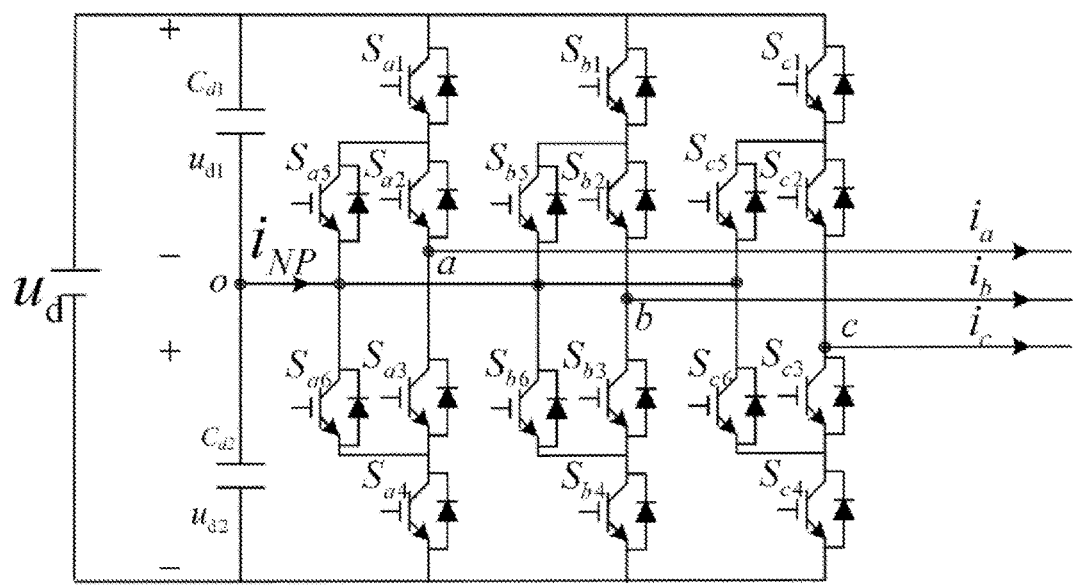
FIG. 1C is a topological diagram of an ANPC three-level circuit used in the embodiment of the present invention.

The control method for balancing neutral point voltage of a three-level circuit disclosed in the embodiment may also be applied to an ANPC three-level circuit topology, as shown in FIG. 1C, of which the capacitance bridge arm is the same as the DNPC three-level circuit topology, and further comprises a, b and c switch bridge arms. Taking the a phase bridge arm for example, the a phase bridge arm has six switch devices, for example, IGBT, which are respectively $S_{a1}$, $S_{a2}$, $S_{a3}$, $S_{a4}$, $S_{a5}$, $S_{a6}$, wherein $S_{a1}$, $S_{a2}$, $S_{a3}$ and $S_{a4}$ are connected to the capacitance bridge arm in parallel after being sequentially connected in series, $S_{a5}$ and $S_{a6}$ are connected to $S_{a2}$ and $S_{a3}$ in parallel after being sequentially connected in series, connecting ends of $S_{a5}$ and $S_{a6}$ are electrically connected to the neutral point level end O, and connecting ends of $S_{a2}$ and $S_{a3}$ are AC output ends of the a phase bridge arm. The b and c phase switch bridge arms may have the same structure as the a phase switch bridge arm, as shown in FIG. 1B, the switch devices of the b phase switch bridge arm are shown by $S_{b1}$, $S_{b2}$, $S_{b3}$, $S_{b4}$, $S_{b5}$, $S_{a6}$, and the switch devices of the c phase switch bridge arm are shown by $S_{c1}$, $S_{c2}$, $S_{c3}$, $S_{c4}$, $S_{c5}$, $S_{c6}$. In other words, any one of the a, b and c phase switch bridge arms includes a first switch device, a second switch device, a third switch device, a fourth switch device, a fifth switch device and a sixth switch device; a first end of the first switch device is electrically connected to the first end of the upper capacitor, a second end of the first switch device is electrically connected to a first end of the second switch device and a first end of the fifth switch device, a second end of the second switch device is electrically connected to a first end of the third switch device, a second end of the third switch device is electrically connected to a first end of the fourth switch device and a second end of the sixth switch device, a second end of the fourth switch device is electrically connected to the second end of the lower capacitor, a second end of the fifth switch device is electrically connected to a first end of the sixth switch device and the neutral point level end.

Figure 1D:
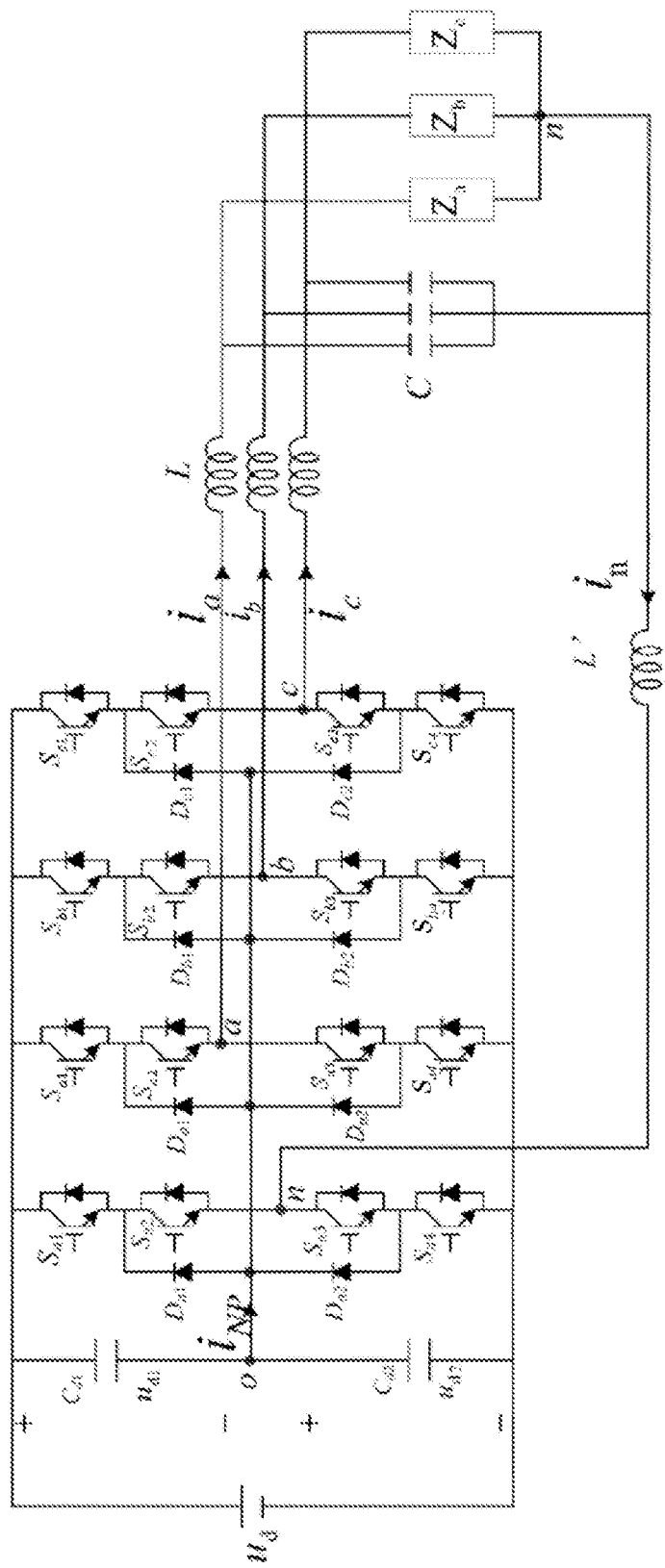
FIG. 1D is a topological diagram of a three-phase four bridge arm NPC three-level circuit used in the embodiment of the present invention.

In some embodiments, the control method for balancing neutral point voltage of a three-level circuit disclosed in the present may be applied to a three-phase four bridge arm three-level circuit topology, which may be suitable for the three-phase four wire electrical system. Taking the DNPC three-level circuit topology for example, as shown in FIG. 1D, it comprises a, b, c and n switch bridge arms, the a phase bridge arm has four IGBT, which are respectively $S_{a1}$, $S_{a2}$, $S_{a3}$, $S_{a4}$, and two clamped diodes, which are respectively $D_{a1}$, $D_{a2}$, wherein $S_{a1}$, $S_{a2}$, $S_{a3}$ and $S_{a4}$ are connected to the capacitance bridge arm in parallel after being sequentially connected in series, $D_{a1}$ and $D_{a2}$ are connected to $S_{a2}$ and $S_{a3}$ in parallel after being sequentially connected in series, connecting ends of $D_{a1}$ and $D_{a2}$ are electrically connected to the neutral point level end O, and connecting ends of $S_{a2}$ and $S_{a3}$ are AC output ends of the a phase bridge arm. The b and c phase switch bridge arms are the same as the a phase switch bridge arm. The n phase switch bridge arm has four IGBT, which are respectively $S_{n1}$, $S_{n2}$, $S_{n3}$, $S_{n4}$, and two clamped diodes, which are respectively $D_{n1}$ and $D_{n2}$, wherein $S_{n1}$, $S_{n2}$, $S_{n3}$ and $S_{n4}$ are connected to the capacitance bridge arm in parallel after being sequentially connected in series, $D_{n1}$ and $D_{n2}$ are connected to $S_{n2}$ and $S_{n3}$ in parallel after being sequentially connected in series, connecting ends of $D_{n1}$ and $D_{n2}$ are electrically connected to the neutral point level end O, and connecting ends of $S_{n2}$ and $S_{n3}$ are electrically connected to neutral wires of the three-phase four wire system. This embodiment is applied to, but not limited to the DNPC three-level circuit topology, and may also be applied to the T-type and the ANPC three-level circuits. This embodiment may also further add a LC filter and a neutral wire inductor L'.

Although the present invention has been disclosed above by the embodiments, instead of limiting the present invention, any person skilled in the art, without departing from the spirit and scope of the present invention, may make equivalent modifications or variations, which shall be contained within the protection scope of the appended claims of the present invention.

The invention claimed is:

1. A control method for balancing neutral point voltage of a neutral point clamped three-level circuit, wherein the three-level circuit is for converting a DC voltage into a three-phase AC voltage, wherein the three-level circuit comprises a capacitance bridge arm including upper and lower capacitors connected in series and three switch bridge arms electrically connected to the capacitance bridge arm and being a, b and c phase switch bridge arms, respectively, each of the a, b and c phase switch bridge arms includes at least four switch devices to output a positive level, a zero level, or a negative level, wherein the method comprises:

step 11, obtaining a first neutral point voltage to represent a voltage difference between the upper and lower capacitors;

step 12, acquiring a first value range of a duty ratio of a zero level of x phase switch bridge arm through a modulating reference voltage of the x phase switch bridge arm and the DC voltage, wherein x represents a, b and c phase switch bridge arms included in the three-level circuit, and presetting a first set value of the duty ratio of the zero level of the x phase switch bridge arm within the first value range;

step 13, when an absolute value of the first neutral point voltage is larger than a first threshold value, adjusting the first set value to be within the first value range, distributing a second set value for a duty ratio of the positive level of the x phase switch bridge arm and a third set value for a duty ratio of the negative level of the x phase switch bridge arm on the basis of the adjusted first set value, and modulating the switch devices of the x phase switch bridge arm according to the adjusted first, second and third set values, such that the absolute value of the first neutral point voltage is smaller than the first threshold value.

2. The method according to claim 1, wherein the step 12 further includes:

step 121, obtaining the maximum value $d_{xomax}$ of the first value range of the duty ratio of the zero level of the x phase switch bridge arm through $$d_{xomax} = 1 - \frac{|u_{xref}|}{0.5u_d},$$

wherein $u_{xref}$ is the modulating reference voltage of the x phase switch bridge arm, and $u_d$ is the DC voltage; presetting the first set value of the duty ratio of the zero level of the x phase switch bridge arm within the first value range $(0, d_{xomax}]$.

3. The method according to claim 2, wherein the step 12 further includes:

step 122, presetting the first set value as the maximum value $d_{xomax}$ of the first value range of the x phase switch bridge arm.

4. The method according to claim 1, wherein the three-level circuit outputs the three-phase AC voltage to a load, and the step 13 further includes:

step 131, on the basis of the first neutral point voltage, when it is determined that a voltage of the upper capacitor is larger than a voltage of the lower capacitor: decreasing the first set value of the duty ratio of the zero level of the x phase switch bridge arm when a current of the x phase switch bridge arm flows from the three-level circuit to the load, and increasing the first set value of the duty ratio of the zero level of the x phase switch bridge arm when the current of the x phase switch bridge arm flows from the load to the three-level circuit; or on the basis of the first neutral point voltage, when it is determined that the voltage of the upper capacitor is smaller than the voltage of the lower capacitor: increasing the first set value of the duty ratio of the zero level of the x phase switch bridge arm when the current of the x phase switch bridge arm flows from the three-level circuit to the load, and decreasing the first set value of the duty ratio of the zero level of the x phase switch bridge arm when the current of the x phase switch bridge arm flows from the load to the three-level circuit.

5. The method according to claim 1, wherein the step 13 further includes:

step 132, modulating the first set value $d_{xo}$ a through the following formula:

$$d_{xo} = \begin{cases} 1 - \frac{|u_{xref}|}{0.5u_d} - k_p u_o \text{sign}(i_x), & (u_o \text{ and } i_x \text{ have the same sign, and } |u_o| > u_{th}), \\ 1 - \frac{|u_{xref}|}{0.5u_d}, & \text{(others)} \end{cases}$$

wherein $k_p$ is a proportioncontrol parameter, $u_o$ is the first neutral point voltage, $i_x$ is an output current of the x phase switch bridge arm, $u_{th}$ is the first threshold value, $u_{xref}$ is the modulating reference voltage of the x phase switch bridge arm, and $u_d$ is the DC voltage.

6. The method according to claim 1, wherein the step 13 further includes:

step 133, distributing the second set value $d_{xp}$ for the duty ratio of the positive level of the x phase switch bridge arm and the third set value $d_{xn}$ for the duty ratio of the negative level of the x phase switch bridge arm as:

$$d_{xp} = \left(0.5 + \frac{u_{xref}}{u_d}\right) - 0.5 d_{xo}$$

$$d_{xn} = \left(0.5 - \frac{u_{xref}}{u_d}\right) - 0.5 d_{xo},$$

wherein $u_{xref}$ is the modulating reference voltage of the x phase switch bridge arm, $d_{xo}$ is the first set value, and $u_d$ is the DC voltage.

7. The method according to claim 1, wherein the first, second and third set values of the x phase switch bridge arm do not equal to zero in at least one switch period, such that an output voltage of the x phase switch bridge arm includes the positive level, the negative level and the zero level in the at least one switch period.

8. The method according to claim 1, wherein output voltages of at least two of the a, b and c phase switch bridge arms of the three-level circuit include the positive level, the negative level and the zero level in at least one switch period.

9. The method according to claim 1, wherein when the three-level circuit is applied to a three-phase three wire electrical system, the method further comprises:
step 14, when the absolute value of the first neutral point voltage is smaller than a second threshold value, injecting a zero sequence voltage, wherein the second threshold value is smaller than or equals to the first threshold value.

10. A three-level circuit for converting a DC voltage into a three-phase AC voltage, wherein the three-level circuit comprises a capacitance bridge arm including upper and lower capacitors connected in series and three switch bridge arms electrically connected the capacitance bridge arm and being a, b and c phase switch bridge arms, respectively, wherein each of the a, b and c phase switch bridge arms includes at least four switch devices to output a positive level, a zero level, or a negative level, wherein the three-level circuit adopts the method according to claim 1.

11. The three-level circuit according to claim 10, wherein the capacitance bridge arm includes a first DC input end, a neutral point level end and a second DC input end, wherein a first end of the upper capacitor is electrically connected to the first DC input end, a second end of the upper capacitor is electrically connected to the neutral point level end, a first end of the lower capacitor is electrically connected to the neutral point level end, and a second end of the lower capacitor is electrically connected to the second DC input end;
any one of the a, b and c phase switch bridge arms includes a first switch device, a second switch device, a third switch device, a fourth switch device, a first diode and a second diode; a first end of the first switch device is electrically connected to the first end of the upper capacitor, a second end of the first switch device is electrically connected to a first end of the second switch device, a second end of the second switch device is electrically connected to a first end of the third switch device, a second end of the third switch device is electrically connected to a first end of the fourth switch device, a second end of the fourth switch device is electrically connected to the second end of the lower capacitor; an anode of the first diode and a cathode of the second diode are electrically connected to the neutral point level end, a cathode of the first diode is electrically connected to the second end of the first switch device, and an anode of the second diode is electrically connected to the second end of the third switch device.

12. The three-level circuit according to claim 10, wherein the capacitance bridge arm includes a first DC input end, a neutral point level end and a second DC input end, wherein a first end of the upper capacitor is electrically connected to the first DC input end, a second end of the upper capacitor is electrically connected to the neutral point level end, a first end of the lower capacitor is electrically connected to the neutral point level end, and a second end of the lower capacitor is electrically connected to the second DC input end;
any one of the a, b and c phase switch bridge arms includes a first switch device, a second switch device, a third switch device and a fourth switch device; a first end of the first switch device is electrically connected to the first end of the upper capacitor, a second end of the first switch device is electrically connected to a first end of the fourth switch device and a second end of the third switch device, a first end of the second switch device is electrically connected to a first end of the third switch device, a second end of the second switch device is electrically connected to the neutral point level end, and a second end of the fourth switch device is electrically connected to the second end of the lower capacitor.

13. The three-level circuit according to claim 10, wherein the capacitance bridge arm includes a first DC input end, a neutral point level end and a second DC input end, wherein a first end of the upper capacitor is electrically connected to the first DC input end, a second end of the upper capacitor is electrically connected to the neutral point level end, a first end of the lower capacitor is electrically connected to the neutral point level end, and a second end of the lower capacitor is electrically connected to the second DC input end;
any one of the a, b and c phase switch bridge arms includes a first switch device, a second switch device, a third switch device, a fourth switch device, a fifth switch device and a sixth switch device; a first end of the first switch device is electrically connected to the first end of the upper capacitor, a second end of the first switch device is electrically connected to a first end of the second switch device and a first end of the fifth switch device, a second end of the second switch device is electrically connected to a first end of the third switch device, a second end of the third switch device is electrically connected to a first end of the fourth switch device and a second end of the sixth switch device, a second end of the fourth switch device is electrically connected to the second end of the lower capacitor, and a second end of the fifth switch device is electrically connected to a first end of the sixth switch device and the neutral point level end.

14. The three-level circuit according to claim 10, wherein the three-level circuit is applied to a three-phase four wire electrical system.

15. The three-level circuit according to claim 10, wherein the three-level circuit further comprises a fourth switch bridge arm electrically connected to the capacitance bridge arm and having the same topology as the a, b and c phase switch bridge arms.

16. A control method for balancing neutral point voltage of a neutral point clamped three-level circuit, wherein the three-level circuit is for converting a DC voltage into a three-phase AC voltage and comprises a capacitance bridge arm including upper and lower capacitors connected in series, and three switch bridge arms electrically connected the capacitance bridge arm and being a, b and c phase switch bridge arms, respectively, each of which includes at least four switch devices to output a positive level, a zero level, or a negative level, comprising:
step 21, obtaining a first neutral point voltage to represent a voltage difference between the upper and lower capacitors;

step 22, adjusting a first set value of a duty ratio of the zero level of the x phase switch bridge arm, such that in a same switch period, when modulating reference voltages of the a, b and c phase switch bridge arms are different, duty ratios of the zero levels of the a, b and c phase switch bridge arms are different, wherein x represents the a, b and c phase switch bridge arms included in the three-level circuit;

step 23, distributing a second set value for a duty ratio of the positive level of the x phase switch bridge arm and a third set value for a duty ratio of the negative level of the x phase switch bridge arm on the basis of the first set value, and modulating the switch devices of the x phase switch bridge arm according to the first, second and third set values, such that an output voltage of the x phase switch bridge arm includes positive, negative and zero levels in at least one switch period, and an absolute value of the first neutral point voltage is smaller than a first threshold value.

17. The method according to claim 16, wherein the step 22 further includes:
step 221, obtaining the maximum value $d_{xomax}$ within an adjustable range of the duty ratio of the zero level of the x phase switch bridge arm through $$d_{xomax} = 1 - \frac{|u_{xref}|}{0.5u_d},$$

wherein $u_{xref}$ is the modulating reference voltage of the x phase switch bridge arm, and $u_d$ is the DC voltage; presetting the first set value of the duty ratio of the zero level of the x phase switch bridge arm within a value range $(0,d_{xomax}]$; and the adjusted first set value remains within the value range.

18. The method according to claim 17, wherein presetting the first set value of the duty ratio of the zero level of the x phase switch bridge arm within the value range in step 221 includes:
step 222, presetting the first set value of the x phase switch bridge arm as the maximum value $d_{xomax}$ of the value range.

19. A three-level circuit for converting a DC voltage into a three-phase AC voltage, wherein the three-level circuit comprises a capacitance bridge arm including upper and lower capacitors connected in series, and three switch bridge arms electrically connected the capacitance bridge arm and being a, b and c phase switch bridge arms, respectively, each of which includes at least four switch devices to output a positive level, a zero level, or a negative level, wherein the three-level circuit uses the method according to claim 18.

20. The three-level circuit according to claim 19, wherein the capacitance bridge arm includes a first DC input end, a neutral point level end and a second DC input end, wherein a first end of the upper capacitor is electrically connected to the first DC input end, a second end of the upper capacitor is electrically connected to the neutral point level end, a first end of the lower capacitor is electrically connected to the neutral point level end, and a second end of the lower capacitor is electrically connected to the second DC input end;
any one of the a, b and c phase switch bridge arms includes a first switch device, a second switch device, a third switch device, a fourth switch device, a first diode and a second diode; a first end of the first switch device is electrically connected to the first end of the upper capacitor, a second end of the first switch device is electrically connected to a first end of the second switch device, a second end of the second switch device is electrically connected to a first end of the third switch device, a second end of the third switch device is electrically connected to a first end of the fourth switch device, a second end of the fourth switch device is electrically connected to the second end of the lower capacitor; an anode of the first diode and a cathode of the second diode are electrically connected to the neutral point level end, a cathode of the first diode is electrically connected to the second end of the first switch device, and an anode of the second diode is electrically connected to the second end of the third switch device.

21. The three-level circuit according to claim 19, wherein the capacitance bridge arm includes a first DC input end, a neutral point level end and a second DC input end, wherein a first end of the upper capacitor is electrically connected to the first DC input end, a second end of the upper capacitor is electrically connected to the neutral point level end, a first end of the lower capacitor is electrically connected to the neutral point level end, and a second end of the lower capacitor is electrically connected to the second DC input end;
any one of the a, b and c phase switch bridge arms includes a first switch device, a second switch device, a third switch device and a fourth switch device; a first end of the first switch device is electrically connected to the first end of the upper capacitor, a second end of the first switch device is electrically connected to a first end of the fourth switch device and a second end of the third switch device, a first end of the second switch device is electrically connected to a first end of the third switch device, a second end of the second switch device is electrically connected to the neutral point level end, and a second end of the fourth switch device is electrically connected to the second end of the lower capacitor.

22. The three-level circuit according to claim 19, wherein the capacitance bridge arm includes a first DC input end, a neutral point level end and a second DC input end, wherein a first end of the upper capacitor is electrically connected to the first DC input end, a second end of the upper capacitor is electrically connected to the neutral point level end, a first end of the lower capacitor is electrically connected to the neutral point level end, and a second end of the lower capacitor is electrically connected to the second DC input end;
any one of the a, b and c phase switch bridge arms includes a first switch device, a second switch device, a third switch device, a fourth switch device, a fifth switch device and a sixth switch device; a first end of the first switch device is electrically connected to the first end of the upper capacitor, a second end of the first switch device is electrically connected to a first end of the second switch device and a first end of the fifth switch device, a second end of the second switch device is electrically connected to a first end of the third switch device, a second end of the third switch device is electrically connected to a first end of the fourth switch device and a second end of the sixth switch device, a second end of the fourth switch device is electrically connected to the second end of the lower capacitor, and a second end of the fifth switch device is electrically connected to a first end of the sixth switch device and the neutral point level end.

23. The three-level circuit according to claim 19, wherein the three-level circuit is applied to a three-phase four wire electrical system.

24. The three-level circuit according to claim 19, wherein the three-level circuit further comprises a fourth switch bridge arm electrically connected to the capacitance bridge arm and having the same topology as the a, b and c phase switch bridge arms.

25. The method according to claim 16, wherein the three-level circuit outputs the three-phase AC voltage to a load, and the step 22 further includes:
step 223, on the basis of the first neutral point voltage, when it is determined that a voltage of the upper capacitor is larger than a voltage of the lower capacitor: decreasing the first set value of the duty ratio of the zero level of the x phase switch bridge arm when a current of the x phase switch bridge arm flows from the three-level circuit to the load, and increasing the first set value of the duty ratio of the zero level of the x phase switch bridge arm when the current of the x phase switch bridge arm flows from the load to the three-level circuit; or
on the basis of the first neutral point voltage, when it is determined that the voltage of the upper capacitor is smaller than the voltage of the lower capacitor: increasing the first set value of the duty ratio of the zero level of the x phase switch bridge arm when the current of the x phase switch bridge arm flows from the three-level circuit to the load, and decreasing the first set value of the duty ratio of the zero level of the x phase switch bridge arm when the current of the x phase switch bridge arm flows from the load to the three-level circuit.

26. The method according to claim 16, wherein distributing the second set value for a duty ratio of the positive level of the x phase switch bridge arm and the third set value for a duty ratio of the negative level of the x phase switch bridge arm on the basis of the first set value in the step 23 includes:
step 231, distributing the second set value $d_{xp}$ for a duty ratio of the positive level of the x phase switch bridge arm and the third set value $d_{xn}$ for a duty ratio of the negative level of the x phase switch bridge arm:

$$d_{xp} = \left(0.5 + \frac{u_{xref}}{u_d}\right) - 0.5 d_{xo}$$
$$d_{xn} = \left(0.5 - \frac{u_{xref}}{u_d}\right) - 0.5 d_{xo},$$

wherein $u_{xref}$ is the modulating reference voltage of the x phase switch bridge arm, $d_{xo}$ is the first set value, and $u_d$ is the DC voltage.

27. The method according to claim 16, wherein output voltages of at least two of the a, b and c phase switch bridge arms of the three-level circuit include the positive level, the negative level and the zero level in at least one switch period.

28. The method according to claim 16, wherein when the three-level circuit is applied to a three-phase three wire electrical system, the method further comprises:
step 24, when the absolute value of the first neutral point voltage is smaller than a second threshold value, injecting a zero sequence voltage, wherein the second threshold value is smaller than the first threshold value.

* * * * *